(12) United States Patent
Mizuno

(10) Patent No.: US 7,936,931 B2
(45) Date of Patent: May 3, 2011

(54) IMAGE ENCODING APPARATUS AND IMAGE DECODING APPARATUS

(75) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1045 days.

(21) Appl. No.: 11/697,877

(22) Filed: Apr. 9, 2007

(65) Prior Publication Data

US 2007/0237412 A1 Oct. 11, 2007

(30) Foreign Application Priority Data

Apr. 10, 2006 (JP) .................................. 2006-107453

(51) Int. Cl.
*G06K 9/36* (2006.01)
*G06K 9/46* (2006.01)
(52) U.S. Cl. ........ 382/232; 382/233; 382/240; 382/250; 382/251; 382/274
(58) Field of Classification Search .................. 382/240, 382/232, 233, 250, 251, 252, 253, 227, 275, 382/276, 274; 375/240.25; 704/230, 226; 358/3.26

See application file for complete search history.

(56) References Cited

U.S. PATENT DOCUMENTS

| 5,949,488 A | * | 9/1999 | Kim ......................... 375/240.04 |
| 6,983,065 B1 | * | 1/2006 | Akgul et al. ................... 382/141 |
| 2004/0179740 A1 | * | 9/2004 | Yasuhiro, II ................... 382/232 |

FOREIGN PATENT DOCUMENTS

| JP | 2003-324613 | 11/2003 |
| JP | 2004-064180 | 2/2004 |

OTHER PUBLICATIONS

Office Action dated Jan. 6, 2011, Japanese Application No. 2006-107453, (w/English translation), pp. 1-5.

\* cited by examiner

*Primary Examiner* — Samir A Ahmed
*Assistant Examiner* — Ali Bayat
(74) *Attorney, Agent, or Firm* — Oblon, Spivak, McClelland, Maier & Neustadt, L.L.P.

(57) ABSTRACT

A conversion control unit divides a transform coefficient into code blocks. A storing device has a storage capacity corresponding to data size of the code blocks. To the conversion control unit, rotation/inversion control information including information of the rotation angle and the inverting direction is input. The conversion control unit generates a control signal on the basis of the rotation/inversion control information and sub-band information of the transform coefficient. An address generating unit generates a write address on the basis of a control signal. By accessing the storing device in predetermined order on the basis of the write address at the time of writing the code block to the storing device, an image rotating/inverting process is performed.

12 Claims, 21 Drawing Sheets

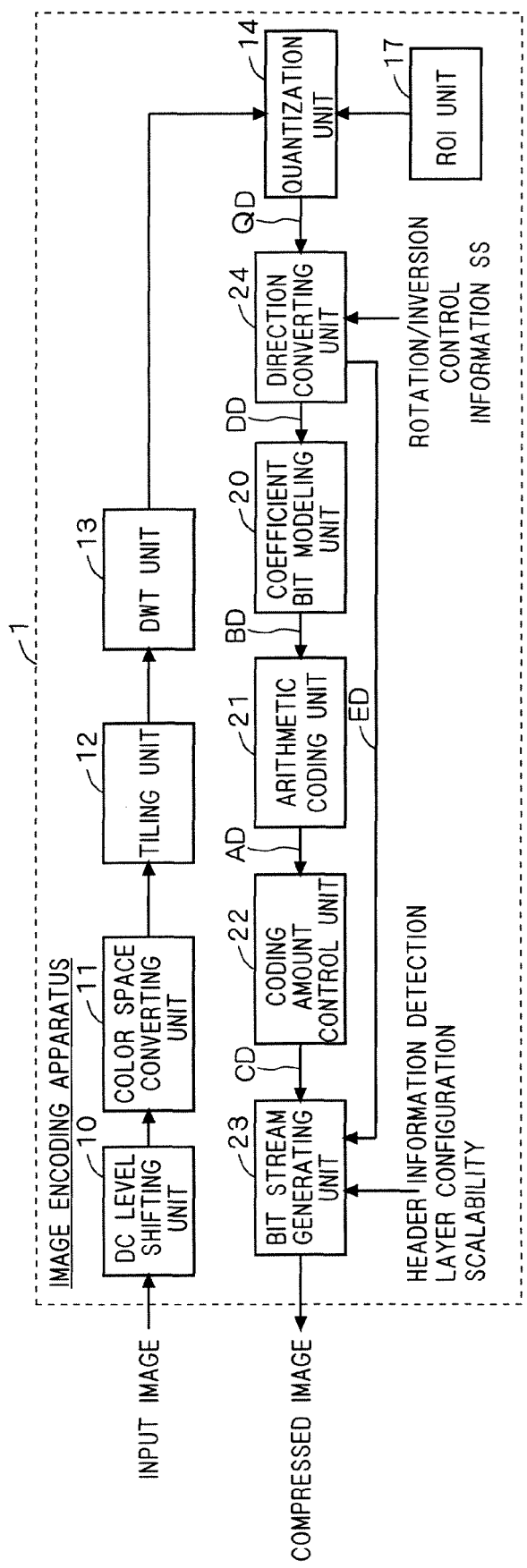

F I G . 6
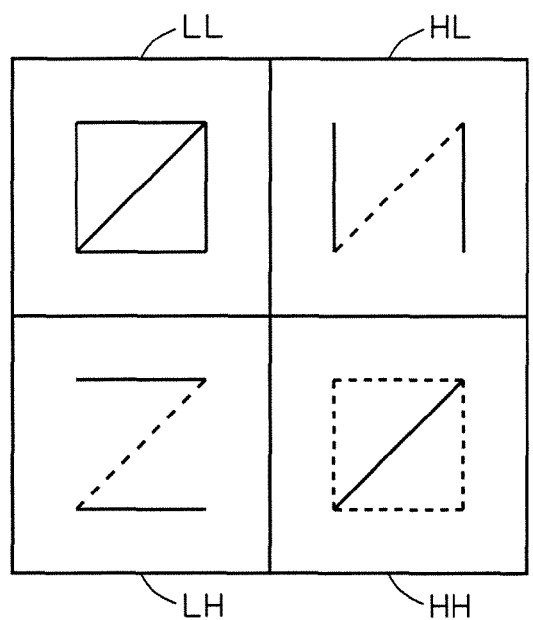
F I G . 7
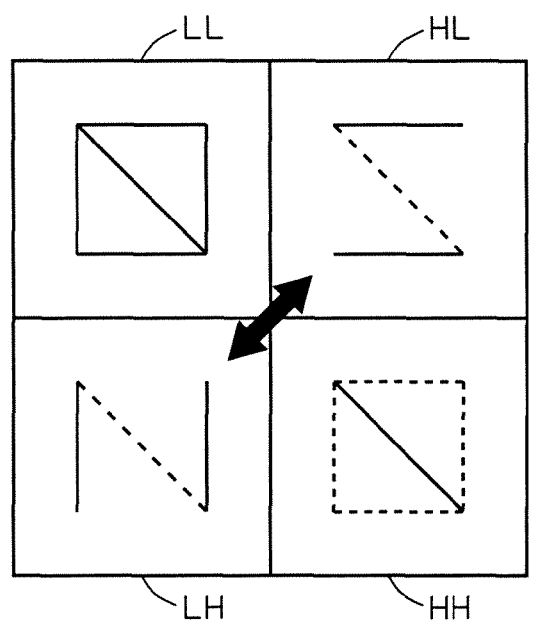

F I G . 8
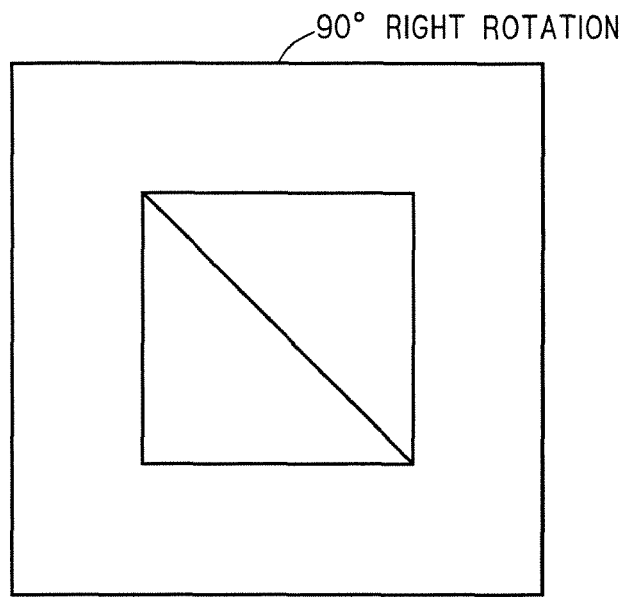
F I G . 9
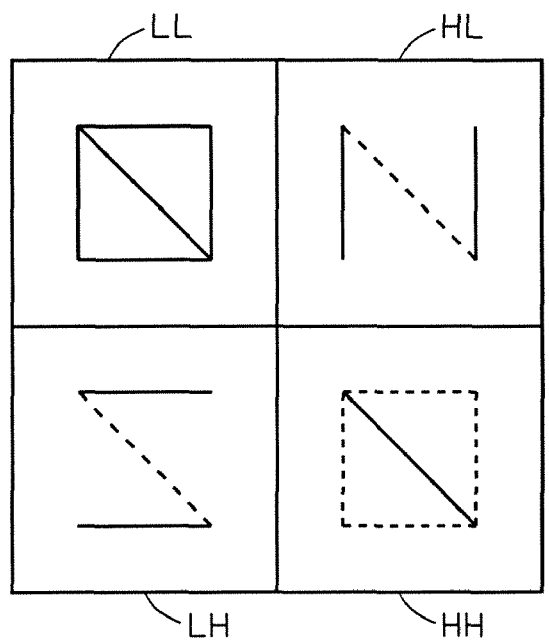

F I G . 1 0
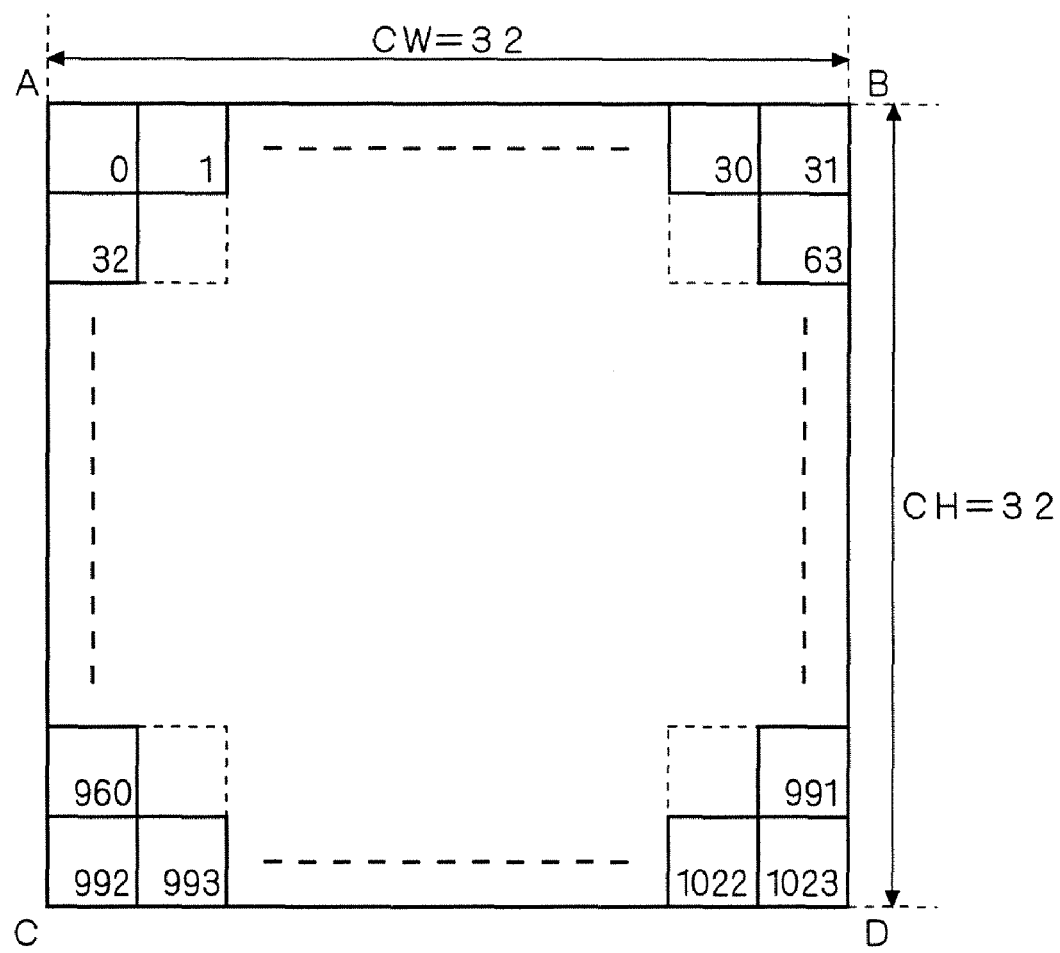

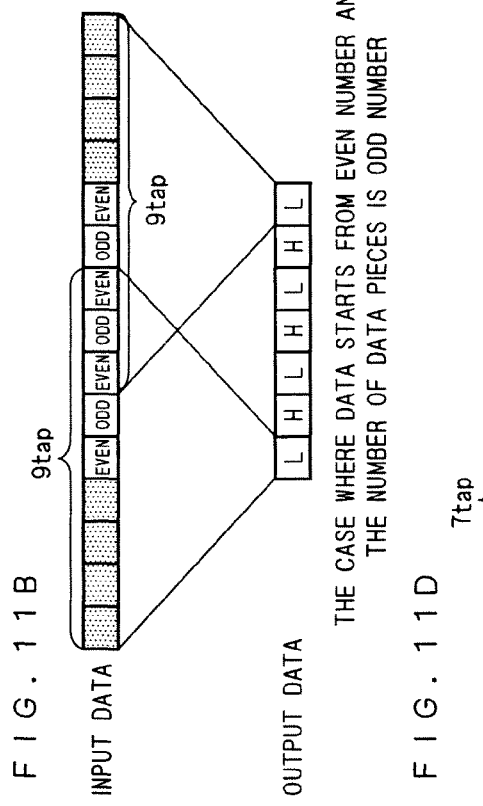
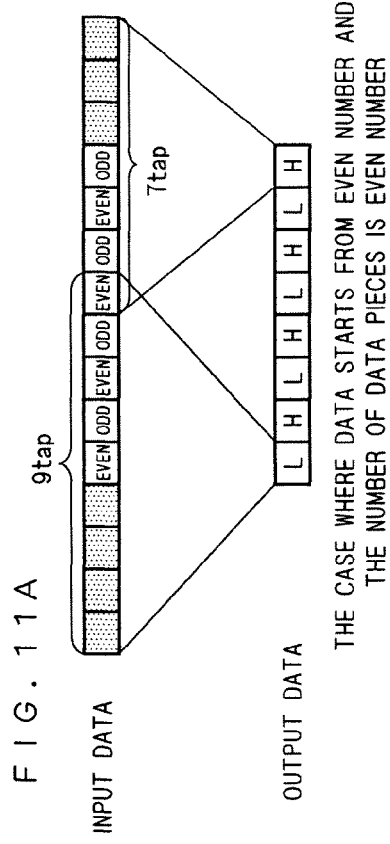
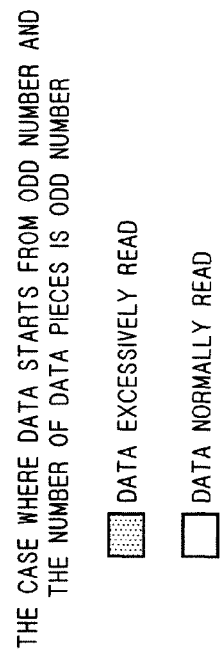

FIG. 11A — THE CASE WHERE DATA STARTS FROM EVEN NUMBER AND THE NUMBER OF DATA PIECES IS EVEN NUMBER

FIG. 11B — THE CASE WHERE DATA STARTS FROM EVEN NUMBER AND THE NUMBER OF DATA PIECES IS ODD NUMBER

FIG. 11C — THE CASE WHERE DATA STARTS FROM ODD NUMBER AND THE NUMBER OF DATA PIECES IS EVEN NUMBER

FIG. 11D — THE CASE WHERE DATA STARTS FROM ODD NUMBER AND THE NUMBER OF DATA PIECES IS ODD NUMBER

DATA EXCESSIVELY READ
DATA NORMALLY READ

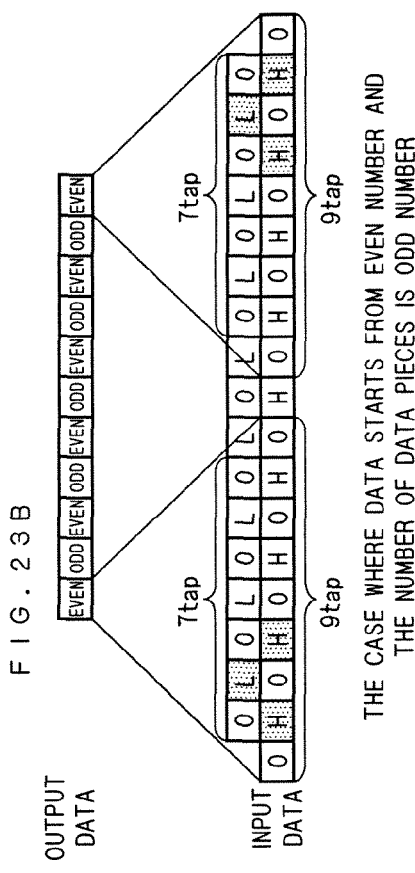

FIG. 23A

THE CASE WHERE DATA STARTS FROM EVEN NUMBER AND THE NUMBER OF DATA PIECES IS EVEN NUMBER

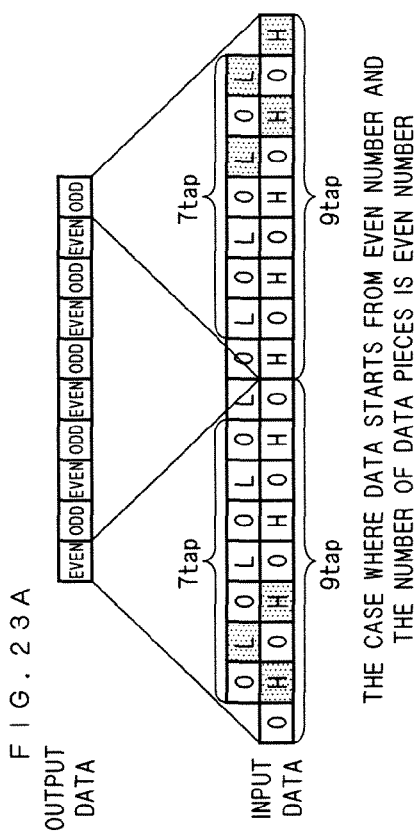

FIG. 23C

THE CASE WHERE DATA STARTS FROM ODD NUMBER AND THE NUMBER OF DATA PIECES IS EVEN NUMBER

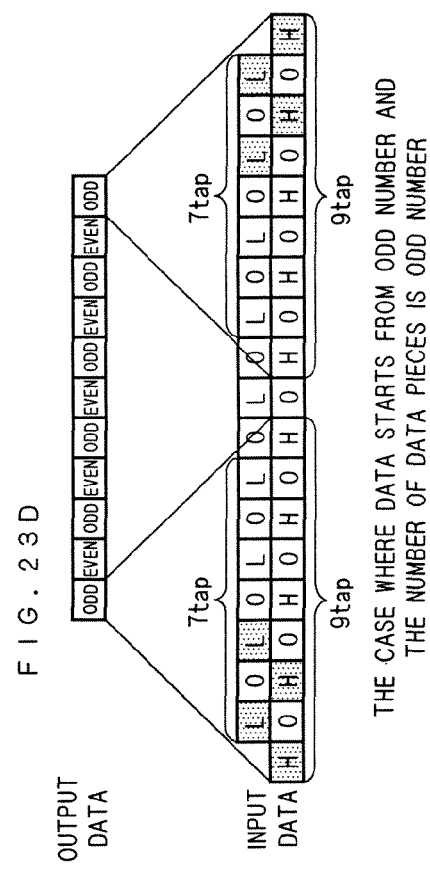

FIG. 23B

THE CASE WHERE DATA STARTS FROM EVEN NUMBER AND THE NUMBER OF DATA PIECES IS ODD NUMBER

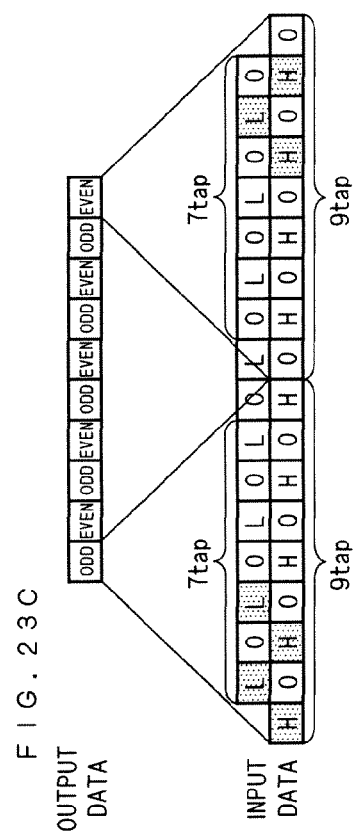

FIG. 23D

THE CASE WHERE DATA STARTS FROM ODD NUMBER AND THE NUMBER OF DATA PIECES IS ODD NUMBER

▨ DATA EXCESSIVELY READ

☐ DATA NORMALLY READ ize an image into a plurality of small regions (tiles) by tiling process and performing a rotating process on a tile unit basis is also conventionally known.

IMAGE ENCODING APPARATUS AND IMAGE DECODING APPARATUS

BACKGROUND OF THE INVENTION

1. Field of the Invention

The present invention relates to an image encoding apparatus and an image decoding apparatus.

2. Description of the Background Art

Hitherto, as methods of obtaining a rotated image or inverted image subjected to compression coding, a method of rotating/inverting a whole image and, after that, performing compression coding on the image and a method of performing compression coding on an image and then rotating/inverting the whole image are known. A technique of dividing an image into a plurality of small regions (tiles) by tiling process and performing a rotating process on a tile unit basis is also conventionally known.

In an input device such as CCD and a display device such as LCD, image data is processed in a raster scan order. Therefore, it is desired that image data be stored in the raster scan order in a memory.

In the method of rotating/inverting a whole image and performing compression coding on the image, a page memory capable of random access is used on the input side and image data is written to the memory by accesses in the direction different from the raster scan order, thereby realizing rotation/inversion of the image. In the method of performing compression coding on an image and rotating/inverting the whole image, a page memory capable of random access is used on the output side and image data is read from the memory by accesses in the direction different from the raster scan order, thereby realizing rotation/inversion of the image.

However, the methods have to use an expensive page memory, the cost is high. Moreover, to store a whole image, a memory having a large storage capacity has to be mounted, and it increases the cost.

In the method of performing the rotating process on the tile unit basis, a memory having a small storage capacity can be used, so that the cost is lower. However, rectangular distortion called tile distortion occurs due to the tiling process and the picture quality is low.

SUMMARY OF THE INVENTION

The present invention is directed to an image encoding apparatus.

According to the present invention, the image encoding apparatus includes: a wavelet transforming unit for generating transform coefficients of a plurality of band components by recursively splitting image signals to a high-pass component and a low-pass component by wavelet transformation; a quantizing unit for quantizing the transform coefficient; a rotating unit for dividing the quantized transform coefficient on a code block unit basis and, on the basis of rotation control information including rotation angle input from the outside, performing an image rotating process on the code block unit basis; and a coding unit for performing entropy coding on the code block.

Without using a memory having a large storage capacity and without causing tile distortion, the image rotating process can be executed efficiently.

According to an aspect of the present invention, an image encoding apparatus includes: a wavelet transforming unit for generating transform coefficients of a plurality of band components by recursively splitting image signals to a high-pass component and a low-pass component by wavelet transformation; a quantizing unit for quantizing the transform coefficient; an inverting unit for dividing the quantized transform coefficient on a code block unit basis and, on the basis of inversion control information input from the outside, performing an image inverting process on the code block unit basis; and a coding unit for performing entropy coding on the code block.

Without using a memory having a large storage capacity and without causing tile distortion, the image inverting process can be executed efficiently.

The present invention is also directed to an image decoding apparatus.

According to the present invention, the image decoding apparatus includes: a decoding unit for generating a code block by performing entropy decoding on a code block unit basis on coded data of an image; a rotating unit for generating a transform coefficient by performing an image rotating process on the code block unit basis, based on rotation control information including rotation angle input from the outside; an inverse-quantizing unit for performing inverse quantization on the transform coefficient; and an inverse wavelet transforming unit for generating an image signal by recursively combining a high-pass component and a low-pass component of the inverse-quantized wavelet transformation by inverse wavelet transform.

Without using a memory having a large storage capacity and without causing tile distortion, the image rotating process can be executed efficiently.

According to an aspect of the present invention, an image decoding apparatus includes: a decoding unit for generating a code block by performing entropy decoding on a code block unit basis on coded data of an image; an inverting unit for generating a transform coefficient by performing an image inverting process on the code block unit basis, based on inversion control information input from the outside; an inverse-quantizing unit for performing inverse quantization on the transform coefficient; and an inverse wavelet transforming unit for generating an image signal by recursively combining a high-pass component and a low-pass component of the inverse-quantized wavelet transformation by inverse wavelet transform.

Without using a memory having a large storage capacity and without causing tile distortion, the image inverting process can be executed efficiently.

An object of the present invention is to provide an image encoding apparatus and an image decoding apparatus realizing efficient image rotating/inverting process without using a memory having a large storage capacity and without causing tile distortion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram showing the configuration of an image encoding apparatus according to a first embodiment of the present invention.

FIG. 6 is a diagram showing the relation between an image rotating process and sub-bands of a transform coefficient.

FIG. 7 is a diagram showing the relation between an image rotating process and sub-bands of a transform coefficient.

FIG. 8 is a diagram showing the relation between an image rotating process and sub-bands of a transform coefficient.

FIG. 9 is a diagram showing the relation between an image rotating process and sub-bands of a transform coefficient.

FIG. 10 is a schematic diagram showing a storage region of a storing device in FIG. 4.

FIGS. 11A to 11D are diagrams showing the positional relations of input/output data in the case of executing DWT using a filter of 9×7 taps.

FIGS. 23A to 23D are diagrams showing positional relations of input/output data in the case where reverse DWT is executed by using a filter of 9×7 taps.

DESCRIPTION OF THE PREFERRED EMBODIMENTS

First Embodiment

Outline of General Apparatus

Figure 2:
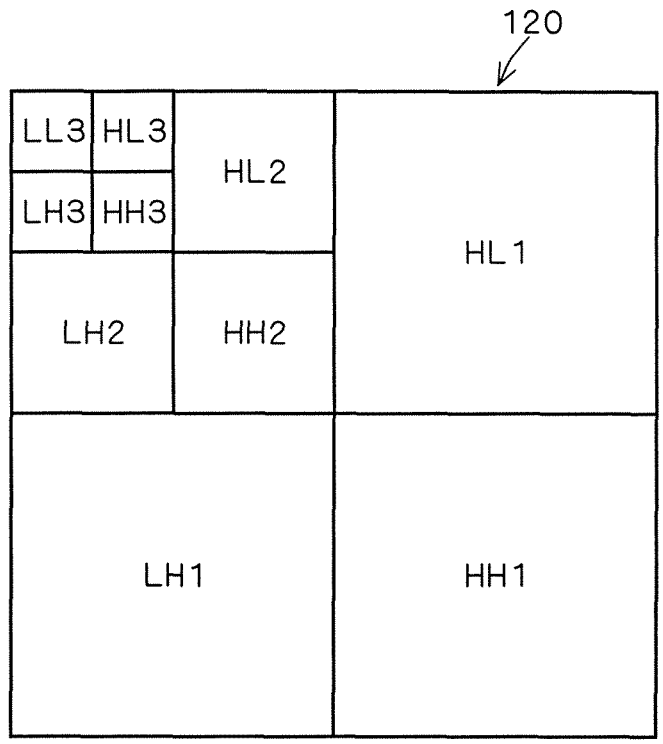
FIG. 2 is a diagram showing a two-dimensional image subjected to DWT of a decomposition level "3" in accordance with the octave band portioning scheme.

FIG. 1 is a functional block diagram showing the configuration of an image encoding apparatus 1 on the basis of the JPEG 2000 compression, according to a first embodiment of the present invention. As shown in FIG. 1, the image encoding apparatus 1 has a DC level shifting unit 10, a color space converting unit 11, a tiling unit 12, a DWT unit 13, a quantization unit 14, an ROI unit 17, a direction converting unit 24, a coefficient bit modeling unit 20, an arithmetic coding unit 21, a coding amount control unit 22, and a bit stream generating unit 23.

All or part of the processing units 10 to 14, 17, and 20 to 23 constructing the image encoding apparatus 1 may be constructed as hardware or a program for making a microprocessor function.

The DC level shifting unit 10 performs a DC level shifting process as necessary on an image signal (an input image in FIG. 1) supplied to the image encoding apparatus 1 from the outside.

The color space converting unit 11 performs a predetermined color space converting process on the image signal input from the DC level shifting unit 10. According to the JPEG 2000 compression, as the color space converting process, RCT (Reversible Component Transformation) and ICT (Irreversible Component Transformation) are prepared and one of them can be properly selected. By the process, for example, an RGB signal input to the color space converting unit 11 is converted to a YCbCr signal or YUV signal.

The tiling unit 12 divides the image signal input from the color space converting unit 11 into a plurality of small rectangular regions called "tiles" by a tiling process. The tiling process is not always necessary and image signals of one frame may be output as they are to the function block at the next stage. In the present invention, a case of processing image signals of one frame as one tile and a process of dividing the image signals into a small number of tiles each having a relatively large size are assumed to avoid or suppress occurrence of tile distortion. The present invention can be also applied to an apparatus in which a normal tiling process is performed.

The DWT unit 13 performs integer-type or real-type DWT on the tile unit basis on an image signal supplied from the tiling unit 12 and outputs a transform coefficient obtained as a result. In the DWT, a one-dimensional filter for dividing a two-dimensional image signal into a high frequency component and a low frequency component is applied in both of the vertical and horizontal directions. Concretely, in the real-type DWT, a filter of 9×7 taps, 5×3 taps, 7×5 taps, or the like is used. In the integer-type DWT, a filter of 5×3 taps, 13×7 taps, or the like is used. The filtering processes may be executed by convolution or the lifting scheme which is more efficient than the convolution.

In the JPEG 2000 compression, so-called octave band splitting scheme of recursively splitting only a band component divided into the low frequency side with respect to both of the vertical and horizontal directions is employed. The number of recursive splitting operation is called a decomposition level.

FIG. 2 is a schematic diagram showing a two-dimensional image 120 subjected to DWT of the decomposition level "3" in accordance with the octave band splitting scheme. At decomposition level "1", by sequentially applying the one-dimensional filter in the vertical direction and the horizontal direction, the two-dimensional image 120 is split into four band components (sub bands) of HH1, HL1, LH1, and LL1 (not shown). "H" denotes a high-pass component, and "L" indicates a low-pass component. For example, "HL1" denotes a band component made of a high-pass component H in the horizontal direction and a low-pass component L in the vertical direction at the decomposition level "1". When the notation is generalized, "XYn" (where X and Y indicate H and L or L and H, respectively, and n denotes a natural number) denotes a band component made of a band component X in the horizontal direction and a band component Y in the vertical direction at decomposition level "n".

At decomposition level "2", the low-pass component LL1 is split to HH2, HL2, LH2, and LL2 (not shown). Further, at decomposition level "3", the low-pass component LL2 is split to HH3, HL3, LH3, and LL3. FIG. 2 shows arrangement of the band components HH1 to LL3 generated as described above. FIG. 2 shows an example where the DWT of the decomposition level "3" is performed. In the JPEG 2000 compression, generally, DWT of the decomposition level of 3 to 8 is employed.

The quantization unit 14 performs scalar-quantization on the transform coefficient input from the DWT unit 13 in accordance with a quantization parameter, and outputs a transform coefficient QD obtained by the scalar quantization. The quantization unit 14 also has the function of performing a predetermined bit shifting process so as to give priority to the picture quality in a region of interest set by the ROI unit 17.

The direction converting unit 24 divides the transform coefficient QD input from the quantization unit 14 into 32×32 or 64×64 code blocks. To the direction converting unit 24, for example, rotation/inversion control signal SS including information of a rotation angle or an inversion direction designated by the user is input from the outside. The direction converting unit 24 performs a process of rotating/inverting an image in each of code blocks on the basis of the rotation/inversion control information SS, and outputs a code block DD after the rotation/inversion process. That is, the direction converting unit 24 functions as a rotation processing unit for performing a process of rotating an image on the code block unit basis and an inverting processing unit for performing a process of inverting an image on the code block unit basis. The direction converting unit 24 does not always have to have both of the functions of the rotating process and the inverting process but may have only one of the functions. Further, the direction converting unit 24 outputs control information ED including information of the rotation angle and the inversion direction related to the code block DD.

Figure 3:
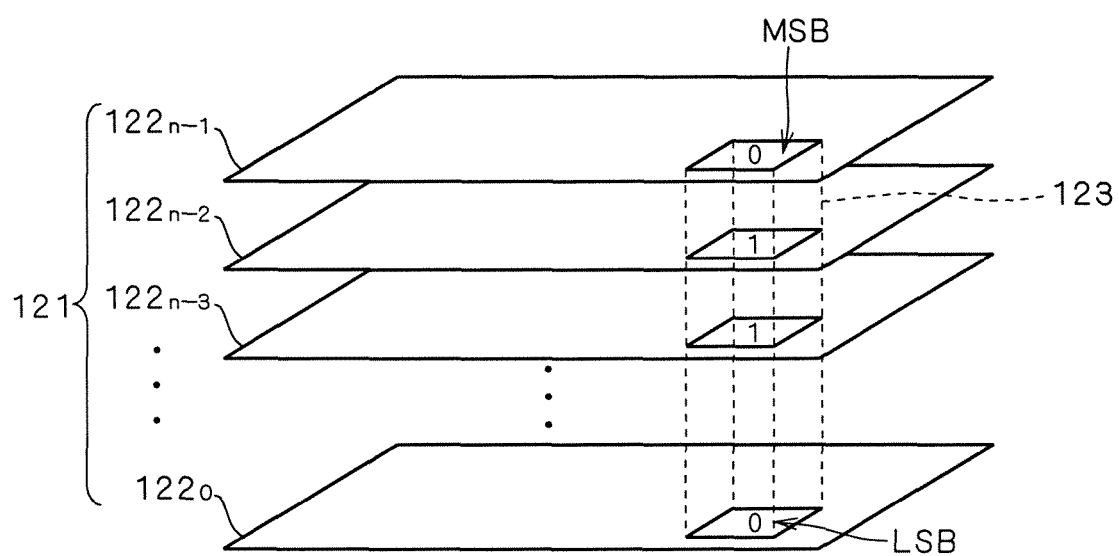
FIG. 3 is a diagram showing n pieces of bit planes obtained by decomposing a code block.

The coefficient bit modeling unit 20 decomposes the code block DD supplied from the direction converting unit 24 to a plurality of bit planes constructed as a two-dimensional array of bits. FIG. 3 is a schematic diagram showing "n" pieces of bit planes $122_0$ to $122_{n-1}$ (n is a natural number) decomposed from a code block 121 (corresponding to the code block DD). As shown in FIG. 3, when a binary value 123 of the transform coefficient at an arbitrary point in the code block 121 is "011 ... 0", the code block 121 is decomposed so that the bits constructing the binary value 123 belong to the bit planes $122_{n-1}, 122_{n-2}, 122_{n-3}, \ldots$, and $122_0$. In FIG. 3, the bit plane $122_{n-1}$ is the most significant bit plane made of only the most significant bits (MSB) of the transform coefficient. The bit plane $122_0$ is a least significant bit plane made of only the least significant bits (LSB) of the transform coefficient.

Further, the coefficient bit modeling unit 20 determines the context of each of the bits in each of the bit planes $122_k$ (k=0 to n-1) and, according to the significance of each bit as a result of the determination, decomposes the bit plane $122_k$ by using three coding passes; an SIG pass (SIGnificance propagation pass), an MR pass (Magnitude Refinement pass), and a CL pass (CLean-up pass). The algorithm of the context determination on each coding pass is determined by EBCOT. According to the EBCOT, "significant" denotes a state where it is known in the preceding coding process that a target coefficient is not zero, and "insignificant" denotes a state where the coefficient value is zero or there is the possibility that the coefficient value is zero.

The coefficient bit modeling unit 20 executes a bit plane coding process using the three coding passes; the SIG pass (the coding pass of a not-significant coefficient which is near a significant coefficient), the MR pass (the coding pass of the significant coefficient), and the CL pass (the coding pass of coefficient information, other than the SIG pass and the MR pass). The bit plane coding is performed by scanning the bits of the bit planes from the most significant bit plane to the least significant bit plane on a four-bit unit basis and determining whether a significant coefficient exists or not. The number of bit planes constructed only by not-significant coefficients (0 bits) is recorded in a packet header. Actual coding starts from a bit plane in which a significant coefficient appears for the first time. The bit plane from which the coding starts is encoded only by the CL pass, and bit planes lower than the bit plane are sequentially coded by the above-described three coding passes.

The arithmetic coding unit 21 performs arithmetic coding on coded data BD supplied from the coefficient bit modeling unit 20, and outputs coded data AD obtained as a result of the arithmetic coding. Concretely, by using an MQ coder, arithmetic coding is executed in encoding pass units on the basis of the context determination result, on the coded data BD supplied from the coefficient bit modeling unit 20. There is also a case where the arithmetic coding unit 21 performs a bypass process of outputting an object to be coded as it is so as to be included in the coded data AD without performing arithmetic coding on part of the object to be encoded. Although the arithmetic coding is employed in the first embodiment, the invention is not limited to the arithmetic coding and entropy coding of another method may be employed.

The coding amount control unit 22 has the function of controlling the rate of the coded data AD supplied from the arithmetic coding unit 21. Concretely, to obtain a target coding amount (a final coding amount of a compressed image), the coding amount control unit 22 executes post-quantization of rounding down the coded data AD on the band component unit basis, the bit plane unit basis, or the pass unit basis in order from lower priority.

The bit stream generating unit 23 generates a bit stream by multiplexing coded data CD supplied from the coding amount control unit 22, the control information ED supplied from the direction converting unit 24, and additional information (header information, layer configuration, scalability, a quantization table, and the like), and outputs the bit stream as a compressed image to the outside.

Process of Direction Converting Unit 24

The process of rotating/inverting an image on the code block unit basis executed by the direction converting unit 24 shown in FIG. 1 will be described in detail hereinbelow.

Figure 4:
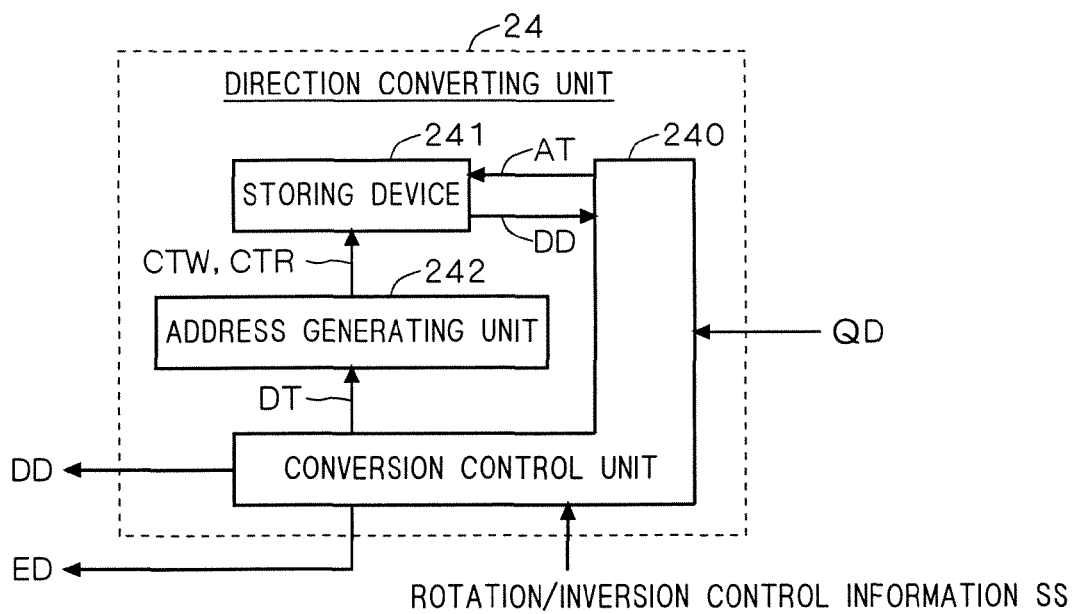
FIG. 4 is a functional diagram showing the configuration of a direction converting unit.

FIG. 4 is a functional block diagram showing the configuration of the direction converting unit 24. As shown in FIG. 4, the direction converting unit 24 has a conversion control unit 240, an address generating unit 242, and a storing device 241.

The conversion control unit 240 divides the transform coefficient QD input from the quantization unit 14 shown in FIG. 1 into 32×32 or 64×64 code blocks AT. The storing device 241 is a semiconductor memory such as DRAM and has a storage capacity corresponding to the data size of the code blocks AT. The code blocks AT are written in the storing device 241 on the basis of a write address CTW generated by the address generating unit 242.

To the conversion control unit 240, the rotation/inversion control information SS including the information of the rotation angle and the inversion direction is input from the outside. In the case of writing the code block AT to the storing device 241, the conversion control unit 240 generates a control signal DT on the basis of the rotation/inversion control information SS and sub-band information of the transform coefficient QD. The control signal DT is input to the address generating unit 242, and the address generating unit 242 generates the write address CTW on the basis of the control signal DT.

The image rotating/inverting process is realized by the write address CTW generated by the address generating unit 242. Specifically, at the time of writing the code block AT to the storing device 241, by accessing the storing device 241 in predetermined order on the basis of the write address CTW, the code block DD subjected to the rotating/inverting process is written in the storing device 241. A method of generating the write address CTW will be described later.

After that, by accessing the storing device 241 in the raster scan order on the basis of a read address CTR generated by the address generating unit 242, the code block DD subjected to the rotating/inverting process is read from the storing device 241. The code block DD is input to the coefficient bit modeling unit 20 shown in FIG. 1 via the conversion control unit 240. The conversion control unit 240 generates and outputs control information ED including the information of the rotation angle and the inversion direction related to the code block DD. The control information ED is input to the bit stream generating unit 23 shown in FIG. 1. The conversion control unit 240 may add the control information ED to the code block DD and output the resultant instead of outputting the control information ED as a signal different from the code block DD. In this case, referring to FIG. 1, the control information ED passes through the coefficient bit modeling unit 20, the arithmetic coding unit 21, and the coding amount control unit 22 in this order and is input to the bit stream generating unit 23.

In the above description, at the time of writing the code block AT to the storing device 241, the rotating/inverting process is performed on the basis of the write address CTW. At the time of reading the code block DD from the storing device 241, an access is performed in the raster scan order. On the contrary, at the time of writing the code block AT to the storing device 241, the storing device 241 may be accessed in the raster scan order. At the time of reading the code block DD from the storing device 241, by accessing the storing device 241 in predetermined order on the basis of the read address CTR, the rotating/inverting process may be performed. In this case, the conversion control unit 240 generates the control signal DT on the basis of the rotation/inversion control information SS and the sub-band information of the transform coefficient QD, and the address generating unit 242 generates the read address CTR on the basis of the control signal DT.

FIGS. 5 to 9 are schematic diagrams for explaining the relation between the image rotating process and the sub-band of the transform coefficient QD. When the DWT is performed only once on the image shown in FIG. 5, the transform coefficient shown in FIG. 6 is obtained. The LL component includes an essential part of the image, and the HL component includes information of edges extending in the vertical direction. The LH component includes information of edges extending in the horizontal direction, and the HH component includes information of an edge extending obliquely. The size of each of the sub bands is the quarter of the size of the original image before the DWT. A case where each sub band corresponds to one code block is assumed here.

When a process of rotating the transform coefficient shown in FIG. 6 in the right direction by 90° is executed, a transform coefficient shown in FIG. 7 is obtained. In the image encoding apparatus 1 of the first embodiment, as shown in FIG. 1, after the DWT process is performed by the DWT unit 13, the rotating process is performed by the direction converting unit 24. Consequently, in the case where the image shown in FIG. 5 is an image input to the image encoding apparatus 1, the transform coefficient shown in FIG. 7 is obtained.

Figure 5:
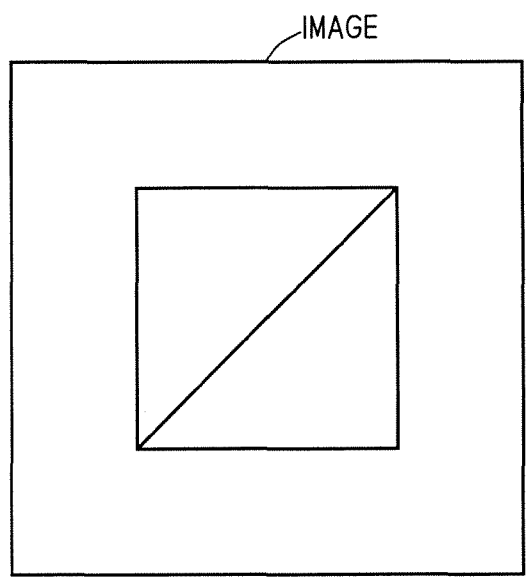
FIG. 5 is a diagram showing the relation between an image rotating process and sub-bands of a transform coefficient.

On the other hand, when a process of rotating the image shown in FIG. 5 in the right direction by 90°, the image shown in FIG. 8 is obtained. When the DWT is executed only once on the image shown in FIG. 8, the transform coefficient shown in FIG. 9 is obtained. The transform coefficient shown in FIG. 9 is a target transform coefficient.

It is understood from comparison between FIGS. 7 and 9 that the sub-bands of the HL component and the LH component are interchanged. Therefore, to obtain the target transform coefficient shown in FIG. 9, a process of interchanging the HL component and the LH component in the transform coefficient (corresponding to the code block DD) of FIG. 7 output from the direction converting unit 24 is necessary. The interchanging process is executed by the bit stream generating unit 23 on the basis of the control information ED.

In a manner similar to the 90° right-direction rotating process, also in the case of 270° right-direction rotation, the process of interchanging the HL component and LH component is necessary. In the case of the 0° right-direction rotation and 180° right-direction rotation, such interchanging process is unnecessary. Since the control information ED includes the information of the rotation angle, the bit stream generating unit 23 executes the process of interchanging the HL component and the LH component in the case where the rotation angle is 90° or 270° on the basis of the control information ED.

Next, the case where each of the sub bands of the transform coefficient QD is divided into 32×32 code blocks AT will be taken as an example, and a method of generating the write address CTW by the address generating unit 242 shown in FIG. 4 will be described.

FIG. 10 is a schematic diagram showing the storage region of the storing device 241 illustrated in FIG. 4. Addresses from "0" to "1023" are assigned to the 32×32 code blocks AT in the raster scan order as shown in FIG. 10. In FIG. 10, the code block width (the size in the row direction) is defined as CW, the code block height (the size in the column direction) is defined as CH, and four vertexes are defined as A, B, C, and D.

Generally, the addresses of the vertexes A, B, C, and D are given as follows.

$$\begin{cases} A = 0 \\ B = CW - 1 \\ C = CW \times (CH - 1) \\ D = CW \times CH - 1 \end{cases} \quad \text{Equation (1)}$$

In the example of FIG. 10, the code block width CW is 32 and the code block height CH is 32, so that A=0, B=31, C=992, and D=1023.

In correspondence with FIG. 10, an equation for obtaining an access address "k" for accessing the storing device 241 at the time of writing the code block AT is as follows.

$$\text{Equation (2)}$$
for $(j = 0; j < \text{MAX}H; j++)\{$ $\quad k = ADRS_{start} + j \times \Delta_1;$ $\quad$ for $(i = 0; i < \text{MAX}W; i++)\{$ $\quad\quad$ Access address $k$ $\quad\quad k = k + i \times \Delta_p;$ $\quad\}$ $\}$ For example, in the case where the right rotation angle is 0° and there is no inversion, the raster scan has to be performed up to the vertex D in the direction from the vertex A to the vertical B. Therefore, the address generating unit 242 calculates the access address "k" by the equation where the start address $ADRS_{start}$=A, MAXW=CW, MAXH=CH, pixel increase amount $\Delta_p$=1, and line increase amount $\Delta_l$=CW. In this case, it is unnecessary to perform the process of interchange between LH component and the HL component by the bit stream generating unit 23.

For example, in the case where the right rotation angle is 90° and there is no inversion, the raster scan has to be performed up to the vertex D in the direction from the vertex C to the vertical A. Therefore, the address generating unit 242 calculates the access address "k" by the equation where the start address $ADRS_{start}$=C, MAXW=CH, MAXH=CW, pixel increase amount $\Delta_p$=−CH, and line increase amount $\Delta_l$=1. In this case, it is necessary to perform the process of interchange between LH component and the HL component by the bit stream generating unit 23.

For example, in the case where the right rotation angle is 0° and lateral inversion is performed, the raster scan has to be performed up to the vertex C in the direction from the vertex B to the vertical A. Therefore, the address generating unit 242 calculates the access address "k" by the equation where the start address $ADRS_{start}$=B, MAXW=CW, MAXH=CH, pixel increase amount $\Delta_p$=−1, and line increase amount $\Delta_l$=CW. In this case, it is unnecessary to perform the process of interchange between LH component and the HL component by the bit stream generating unit 23.

For example, in the case where the right rotation angle is 90° and vertical inversion is performed, the raster scan has to be performed up to the vertex A in the direction from the vertex D to the vertical B. Therefore, the address generating unit 242 calculates the access address "k" by the equation where the start address $ADRS_{start}$=D, MAXW=CH, MAXH=CW, pixel increase amount $\Delta_p$=−CH, and line increase amount $\Delta_l$=−1. In this case, it is necessary to perform the process of interchange between LH component and the HL component by the bit stream generating unit 23.

Table 1 shows the start address $ADRS_{start}$, MAXW, MAXH, pixel increase amount $\Delta_p$, line increase amount $\Delta_l$, and whether the process of interchange between the LH component and the HL component is necessary or not with respect to representative combinations of the right rotation angles (0°, 90°, 180°, and 270°), whether lateral inversion is performed or not, and whether vertical inversion is performed or not.

absence of lateral inversion, and the presence/absence of vertical inversion, and is supplied as the control signal DT to the address generating unit 242.

The address generating unit 242 generates the proper write address CTW according to the rotation angle and the inversion direction on the basis of the equation on the access address "k", the data table of Table 1, and the control signal DT. It realizes desired rotating/inverting process at the time of writing the code block AT to the storing device 241. In this case, the address generating unit 242 generates the read address CTR with the parameters of right rotation angle of 0°, no lateral inversion, and no vertical inversion. With the read address CTR, the code block DD is read in the raster scan order from the storing device 241.

Although the example performing the rotating/inverting process at the time of writing the code block AT to the storing device 241 has been described above, the rotating/inverting process can be also performed at the time of reading the code block DD from the storing device 241. In this case, the address generating unit 242 generates the write address CTW with the parameters of right rotation angle of 0°, no lateral inversion, and no vertical inversion. With the write address CTW, the code block AT is written in the raster scan order in the storing device 241. The address generating unit 242 generates the proper read address CTR according to the rotation angle and the inverting direction on the basis of the equation on the access address "k", the data table of Table 1, and the control signal DT. With the read address CTR, desired rotating/inverting process is realized at the time of reading the code block DD from the storing device 241.

Processes of DWT Unit 13

The processes of the DWT executed by the DWT unit 13 shown in FIG. 1 will be described in detail hereinbelow.

The DWT (decomposition side) used in JPEG 2000, Part 1, has the following rules.

An even-numbered output is a low-pass output, and an odd-numbered output is a high-pass output.

In Part 1 Profile 0, the upper left corner of each sub-band is used as the origin, so that the first output is always a low-pass output.

Next, the number of pieces of extra data to be read to the DWT unit 13 in order to execute DWT will be considered. FIGS. 11A to 11D are diagrams showing positional relations of input/output data in the case of executing the DWT by using a filter of 9×7 taps. FIG. 11A shows a case where a target data sequence starts from even-numbered data (low-pass data L) and the number of data pieces is an even number. FIG. 11B shows a case where a target data sequence starts

TABLE 1

| right rotation angle | start address $ADRS_{start}$ | increase amount $\Delta_p$ | line increase amount $\Delta_l$ | MAXW | MAXH | lateral inversion | vertical inversion | interchange between LH and HL |
|---|---|---|---|---|---|---|---|---|
| 0 | A | 1 | CW | CW | CH | absence | absence | unnecessary |
| 90 | C | −CH | 1 | CH | CW | absence | absence | necessary |
| 180 | D | −1 | −CW | CW | CH | absence | absence | unnecessary |
| 270 | B | CH | −1 | CH | CW | absence | absence | necessary |
| 0 | B | −1 | CW | CW | CH | presence | absence | unnecessary |
| 90 | A | CH | 1 | CH | CW | presence | absence | necessary |
| 180 | C | 1 | −CW | CW | CH | presence | absence | unnecessary |
| 270 | D | −CH | −1 | CH | CW | presence | absence | necessary |
| 0 | C | 1 | −CW | CW | CH | absence | presence | unnecessary |
| 90 | D | −CH | −1 | CH | CW | absence | presence | necessary |
| 180 | B | −1 | CW | CW | CH | absence | presence | unnecessary |
| 270 | A | CH | 1 | CH | CW | absence | presence | necessary |

Referring to FIG. 4, the address generating unit 242 holds the equation on the access address "k" and a data table of Table 1. The rotation/inversion control information SS includes information of the right rotation angle, the presence/ from even-numbered data (low-pass data L) and the number of data pieces is an odd number. FIG. 11C shows a case where a target data sequence starts from odd-numbered data (high-pass data H) and the number of data pieces is an even number. FIG. 11D shows a case where a target data sequence starts from odd-numbered data (high-pass data H) and the number of data pieces is an odd number. In the case of using a filter of 9×7 taps, four patterns shown in FIGS. 11A to 11D are considered by combinations of odd-number and even-number of start data and odd-number and even-number as the number of data pieces. In Part 1 Profile 0, even-numbered data is always start data. Consequently, only the cases of FIGS. 11A and 11B are possible.

Also in the case of a filter of 5×3 taps used in lossless compression, the positional relations of input/output data are similar to those of FIGS. 11A to 11D. The points different from the case of using a filter of 9×7 taps are that the number of taps of a filter on the low-pass side is five, and that on the high-pass side is three.

According to the JPEG 2000 compression, in the DWT, the order of processes is determined such that the vertical filter is applied first and, then, the horizontal filter is applied. Therefore, in the case of performing decoding in accordance with the JPEG 2000 compression, to perfectly regain data by a combining filter, the execution order of the vertical and horizontal filters and the sequence of the high-pass data H and the low-pass data L are important.

Figure 12:
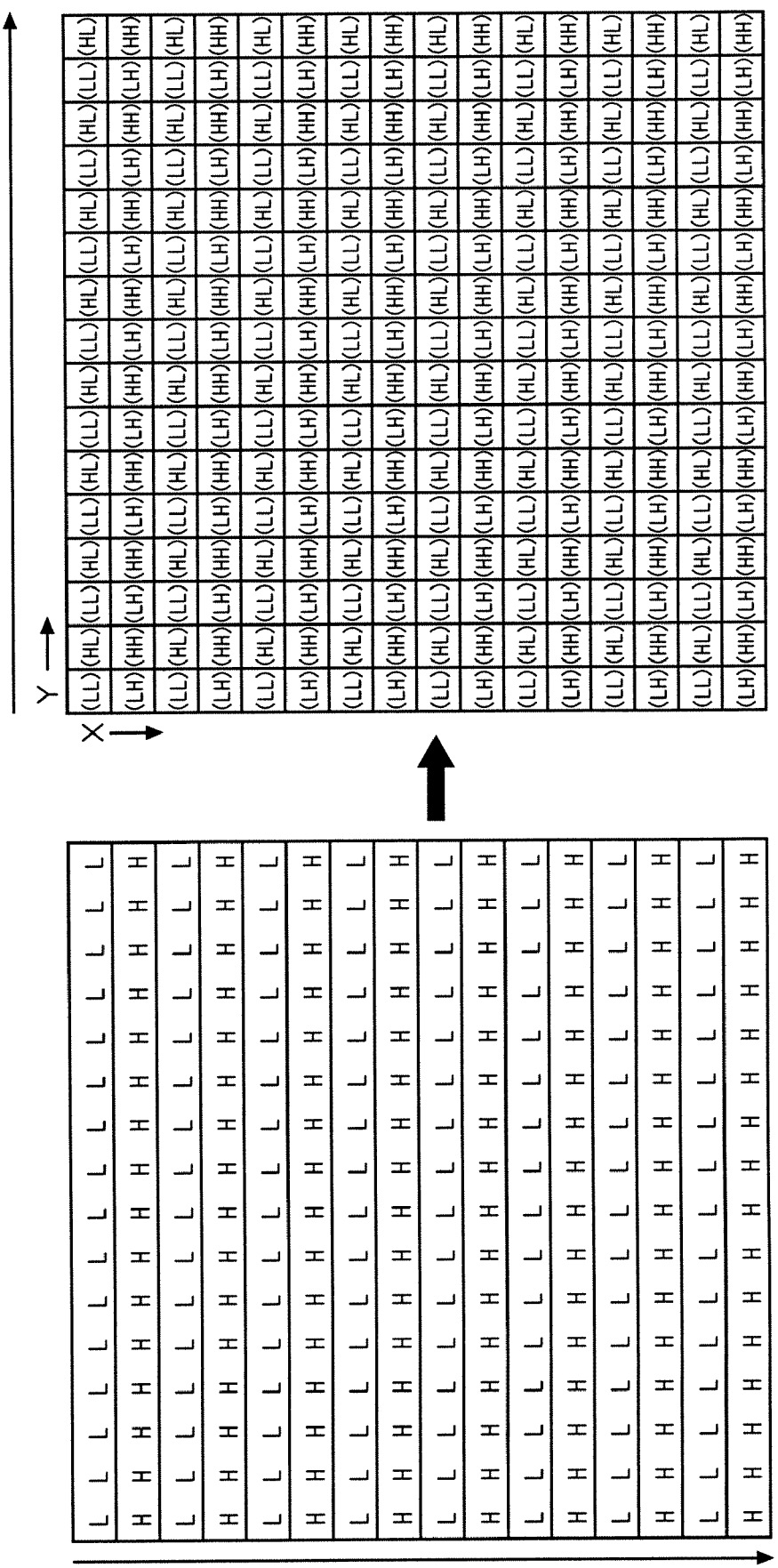
FIG. 12 is a diagram showing a state where image signals of 16 rows by 16 columns are subjected to a two-dimensional filter in accordance with the order of a vertical filter and a horizontal filter.

FIG. 12 is a diagram showing a state where a two-dimensional filter is applied on image signals of 16 rows (from the $0^{th}$ row to the $15^{th}$ row) by 16 columns (from the $0^{th}$ column to the $15^{th}$ column) in order of a vertical filter and a horizontal filter. The left part shows a state after the vertical filter is applied. The right part shows a state after the horizontal filter is applied.

As shown in the left part of FIG. 12, by applying the vertical filter, vertical components in even-numbered rows become low-pass data L, and vertical components in odd-numbered rows become high-pass data H. As shown in the right part of FIG. 12, by further applying the horizontal filter, horizontal components in even-numbered columns become low-pass data L, and horizontal components in odd-numbered columns become high-pass data H. In the right part of FIG. 12, (LL) denotes that both of the horizontal and vertical components are L, (HL) denotes that the horizontal component is H and the vertical component is L, (LH) denotes that the horizontal component is L and the vertical component is H, and (HH) indicates that both of the horizontal and vertical components are H. The arrow X indicates the vertical direction, and the arrow Y expresses the horizontal direction.

First, the inverting process will be examined. In the case where the number of data pieces is an even number as shown in FIGS. 11A and 11C, by performing the inverting process, the positions of the output data H and L are interchanged. On the other hand, in the case where the number of data pieces is an odd number as shown in FIGS. 11B and 11D, even when the inverting process is performed, the positions of the output data H and L are not interchanged. Therefore, in the case of performing the inverting process, the execution order on the outputs of the low-pass filter and the high-pass filter has to be changed in accordance with the number of data pieces (the odd number or even number).

Concretely, the DWT unit 13 has a horizontal filter made of a low-pass filter and a high-pass filter and a vertical filter similarly made of a low-pass filter and a high-pass filter. Although not shown in FIG. 1, the rotation/inversion control information SS is also input to the DWT unit 13. In the case where the DWT unit 13 performs the lateral inversion process on the basis of the rotation/inversion control information SS, the execution order on outputs of the low-pass filter and the high-pass filter in the horizontal filter is not changed when the number of pieces of data in a data sequence to be inverted is odd number, but is changed when the number of pieces of data is even number. Similarly, in the case where the DWT unit 13 performs the vertical inversion process on the basis of the rotation/inversion control information SS, the execution order on outputs of the low-pass filter and the high-pass filter in the vertical filter is not changed when the number of pieces of a data sequence to be inverted is odd number, but is changed when the number of pieces of data is even number.

Next, the rotating process will be examined. In the case of performing the rotating process in the image encoding apparatus 1, to completely convert an image back to the original state by the combining filter at the time of decoding in the JPEG 2000 compression, the positional relations of the components (LL), (HL), (LH), and (HH) after the rotating process by the direction converting unit 24 have to be as shown in the right part of FIG. 12. The positional relations in the inverting process are similar to the above.

Figure 13:
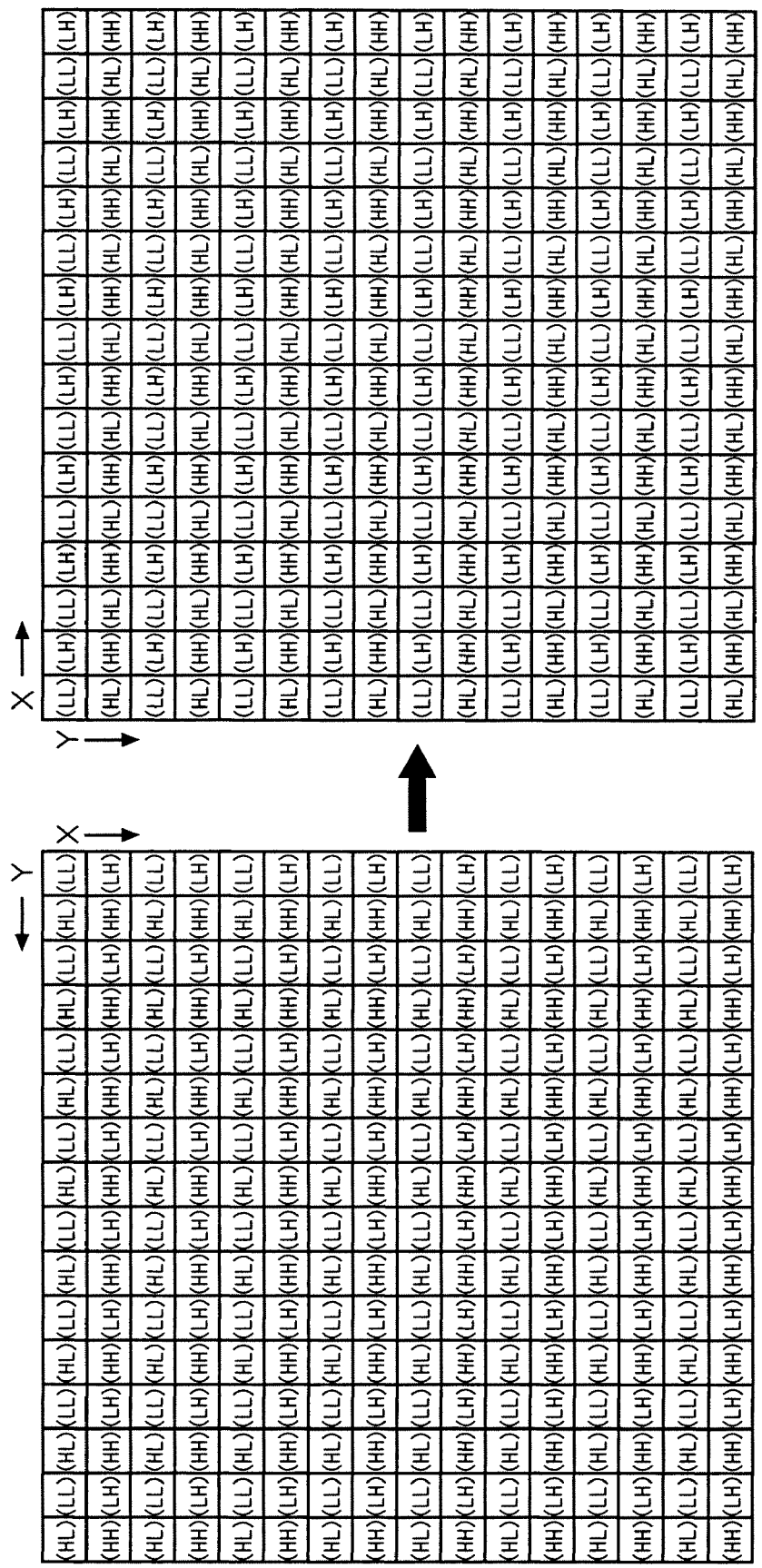
FIG. 13 is a diagram showing a pre-process in the case of performing a process of rotating/inverting image signals of 16 rows by 16 columns.

Therefore, in the case of performing, for example, the lateral inversion process and the 90° right rotation process on an input image, input image signals in a state similar to a state where the lateral inversion process and 270° right rotation process (90° left rotation process) are performed in advance on the input image have to be input to the direction converting unit 24. FIG. 13 is a diagram for explaining a pre-process in the case of performing the rotating/inverting process on image signals of 16 rows by 16 columns. The left part of FIG. 13 shows image signals obtained by performing the lateral inversion process on the image signals in the right part of FIG. 12. The right part of FIG. 13 shows image signals obtained by performing the 270° right rotation process on the image signals of the left part of FIG. 13. That is, in the case of performing the lateral inversion process and the 90° right rotation process on an input image as in the above-described example, it is sufficient to input the image signals in the right part of FIG. 13 to the direction converting unit 24.

To obtain the image signals in the right part of FIG. 13, it is sufficient to change the execution order of the vertical filter and the horizontal filter in the DWT unit 13. That is, the horizontal filter is applied first and the vertical filter is applied next. In the right part of FIG. 13, (LL) denotes that both of the horizontal and vertical components are L, (HL) denotes that the vertical component is H and the horizontal component is L, (LH) denotes that the vertical component is L and the horizontal component is H, and (HH) indicates that both of the horizontal and vertical components are H.

Although the case of performing the 90° right rotation process has been described above, also in the case of performing the 270° right rotation process, the execution order of the vertical filter and the horizontal filter has to be similarly changed. On the other hand, in the case of performing the 0° right rotation or 180° right rotation, it is unnecessary to change the execution order of the vertical filter and the horizontal filter. It is sufficient to apply the vertical filter first and the horizontal filter next like the normal case.

Concretely, the DWT unit 13 has a horizontal filter made of a low-pass filter and a high-pass filter and a vertical filter similarly made of a low-pass filter and a high-pass filter. Although not shown in FIG. 1, the rotation/inversion control information SS is also input to the DWT unit 13. In the case where the DWT unit 13 performs the 90° right rotation or 270° right rotation on the basis of the rotation/inversion control information SS, the filtering process is executed in order of the horizontal filter and then the vertical filter. On the other hand, in the case of performing the 0° right rotation or 180° right rotation, the filtering process is executed in order of the vertical filter and then the horizontal filter.

The configuration and operation of the DWT unit 13 will be more specifically described below. The processes of line-based wavelet transform as one of two-dimensional wavelet transforms will be described.

Figure 14:
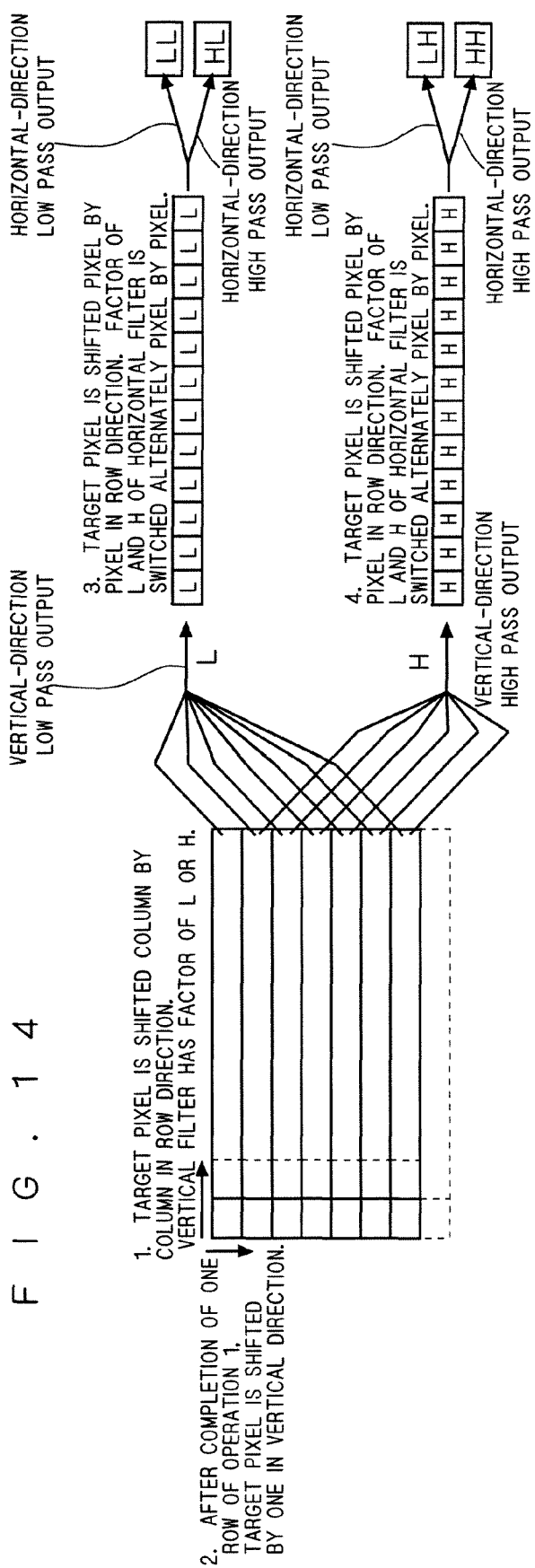
FIG. 14 is a diagram showing a first configuration of a DWT unit realizing line-based wavelet transform.

FIG. 14 is a diagram showing a first configuration of the DWT unit 13 realizing the line-based wavelet transform. In the configuration, two horizontal filters are disposed after one vertical filter. In the case of performing the 0° right rotation or 180° right rotation, the filter having this configuration is used. The number of filters is arbitrary. By increasing the number of filters, the speed of data processing can be increased. On the contrary, by decreasing the number of filters, the circuit scale can be reduced. Since increase in data processing speed and reduction in the circuit scale have the tradeoff relation, it is sufficient to arbitrarily design the number of filters in accordance with an object and environment.

With reference to FIG. 14, first, the filter process with the vertical filter is performed. A target sequence is shifted one by one in the row direction. After processes of one row are finished, the target sequence is shifted by one in the vertical direction (column direction). The factor of the vertical filter is L or H in the same row, and L and H are alternately switched row by row. Next, on each of the low-pass and high-pass outputs in the vertical direction, the filter process with the horizontal filter is performed. A target pixel is shifted one by one in the row direction. The factor of the horizontal filter which is L or H is switched pixel by pixel. As a result, in the horizontal filter corresponding to a low-pass output in the vertical direction, the component (LL) is obtained as a low-pass output in the horizontal direction, and the component (HL) is obtained as a high-pass output in the horizontal direction. In the horizontal filter corresponding to a high-pass output in the vertical direction, the component (LH) is obtained as a low-pass output in the horizontal direction, and the component (HH) is obtained as a high-pass output in the horizontal direction.

Figure 15:
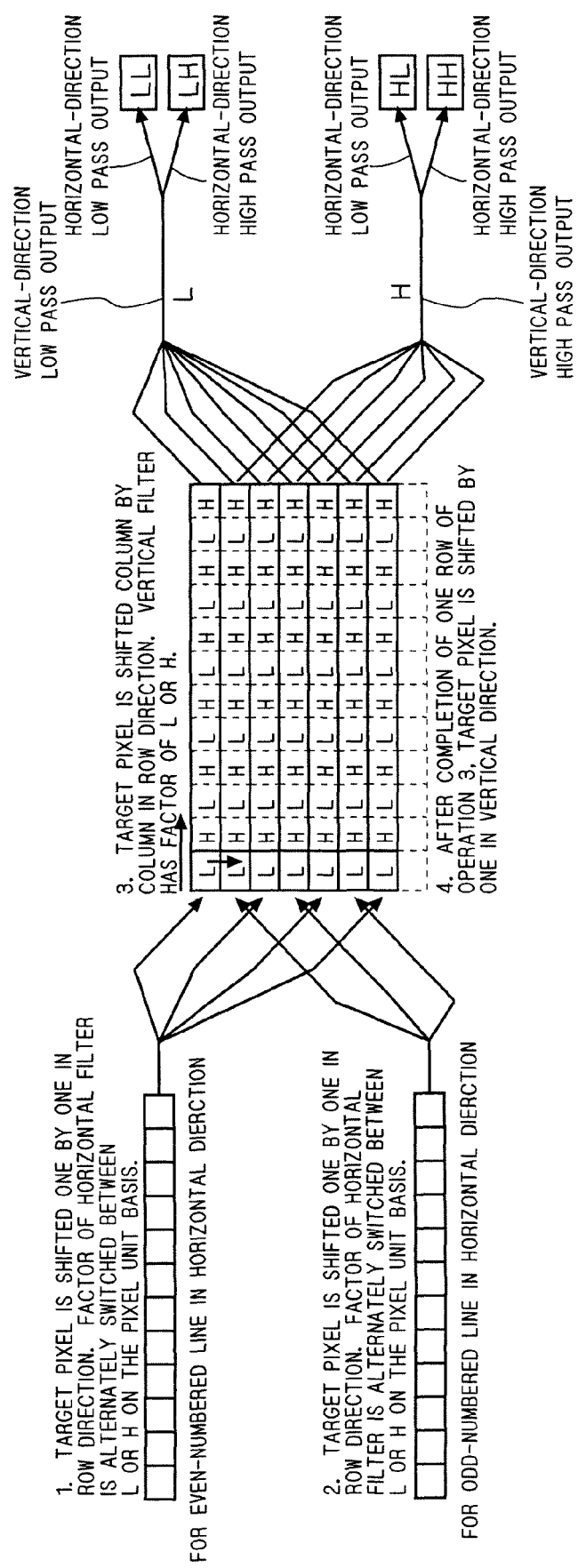
FIG. 15 is a diagram showing a second configuration of the DWT unit realizing the line-based wavelet transform.

FIG. 15 is a block diagram showing a second configuration of the DWT unit 13 realizing the line-based wavelet transform. In the configuration, one vertical filter is disposed after two horizontal filters. In the case of performing the 90° right rotation or 270° right rotation, the filter having this configuration is used. The number of filters is arbitrary as described above.

With reference to FIG. 15, first, the filter process with the horizontal filter for the even-numbered lines and the horizontal filter for odd-numbered lines in the horizontal direction is performed. A target pixel is shifted pixel by pixel in the row direction. The factor of the horizontal filter is alternately switched between L and H pixel by pixel. After completion of the process of one row, the target pixel is shifted by one in the vertical direction, and similar process is repeated. When outputs from the horizontal filter become equal to the amount of a row in the vertical filter, the filtering process with the vertical filter is performed. The target column is shifted one by one in the row direction and, after completion of the process on one row, the target column is shifted by one in the vertical direction. The factor of the vertical filter is L or H in the same row, and L and H are alternately switched row by row. As a result, as the low-pass output in the vertical direction, the component (LL) is obtained in correspondence with the low-pass output in the horizontal direction, and the component (LH) is obtained in correspondence with the high-pass output in the horizontal direction. As the high-pass output in the vertical direction, the component (HL) is obtained in correspondence with the low-pass output in the horizontal direction, and the component (HH) is obtained in correspondence with the high-pass output in the horizontal direction.

The filter configuration of FIG. 14 and that of FIG. 15 may not be different from each other. It is also possible to employ the configuration of FIG. 14 also in the case of performing the 90° right rotation or 270° right rotation. Concretely, referring to FIG. 14, it is sufficient to alternately switch the factor of the vertical filter between L and H column by column in the same row, fix the factor of the horizontal filter on the upper side to L, and fix the factor of the horizontal filter on the lower side to H. In such a manner, the components (LL), (LH), (HL), and (HH) similar to those in FIG. 15 can be output.

Code Block Dividing Process by Conversion Control Unit 240

The code block dividing process executed by the conversion control unit 240 shown in FIG. 4 will be described below.

Figure 16:
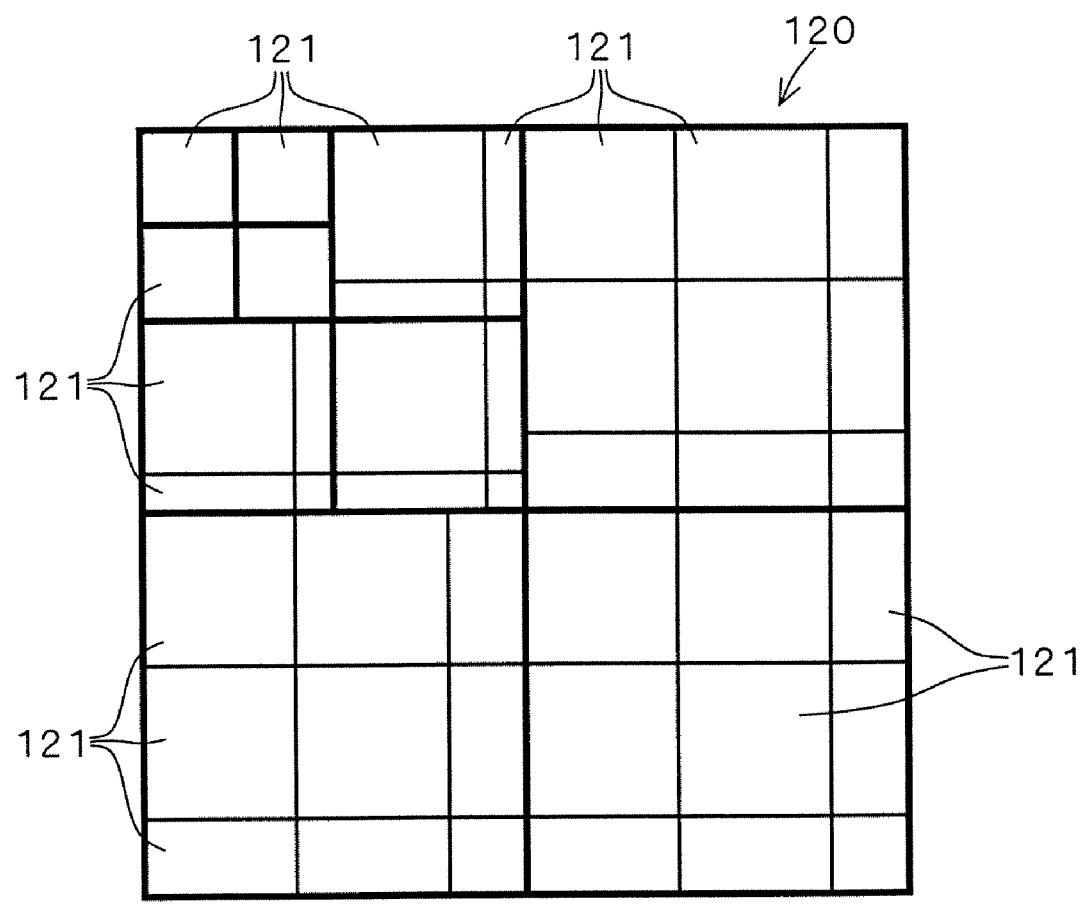
FIG. 16 is a diagram showing a two-dimensional image divided into code blocks.
Figure 17:
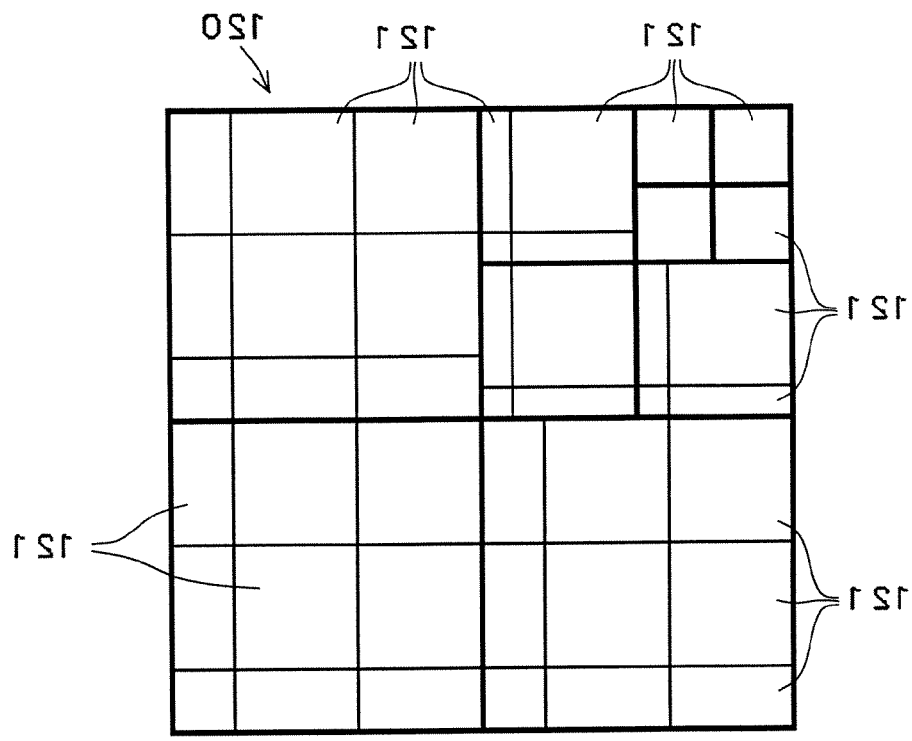
FIG. 17 is a diagram showing a two-dimensional image divided into code blocks.
Figure 18:
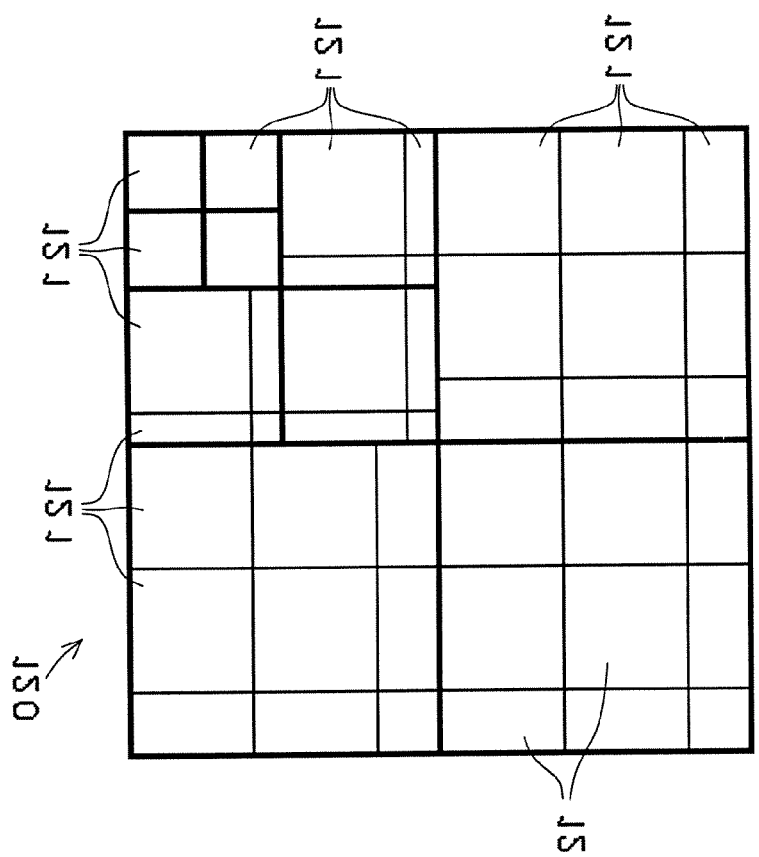
FIG. 18 is a diagram showing a two-dimensional image divided into code blocks.

FIGS. 16 to 18 are diagrams each showing the two-dimensional image 120 divided into code blocks 121. In Part 1 profile 0, as shown in FIG. 16, normally, the code block dividing process is performed by using the upper left corner of each sub-band as the origin.

In the left part of FIG. 13, image signals subjected to the lateral inverting process are shown. To correspond to the image signals, as shown in FIG. 17, the code block dividing process using the upper right corner of each sub-band as the origin is performed.

In the right part of FIG. 13, image signals subjected to the lateral inverting process and 270° right rotation process are shown. To correspond to the image signals, as shown in FIG. 18, the code block dividing process using the upper left corner of each sub-band as the origin is performed.

As described above, the conversion control unit 240 executes the code block dividing process by variably setting the position of the origin of each sub-band in accordance with the rotation angle and the inversion direction on the basis of the rotation/inversion control information SS.

Process of Coefficient Bit Modeling Unit 20

The process of the coefficient bit modeling unit 20 shown in FIG. 1 will be described below. As described above, the coefficient bit modeling unit 20 determines the context of each of bits in each of bit planes $122_k$ shown in FIG. 3 and performs context modeling on the basis of the EBCOT.

Although not shown in FIG. 1, the rotation/inversion control information SS is input to the coefficient bit modeling unit 20. On the basis of the rotation/inversion control information SS, in the case where the rotation angle is 90° or 270° in the right direction, the coefficient bit modeling unit 20 interchanges between the code block DD of the component HL and the code block DD of the component LH, and the context modeling is executed. On the other hand, in the case where the rotation angle is 0° or 180° in the right direction, without performing the process of interchanging the code blocks DD, the context modeling is executed.

Process of Bit Stream Generating Unit 23

The process of the bit stream generating unit 23 shown in FIG. 1 will be described below.

Figure 19:
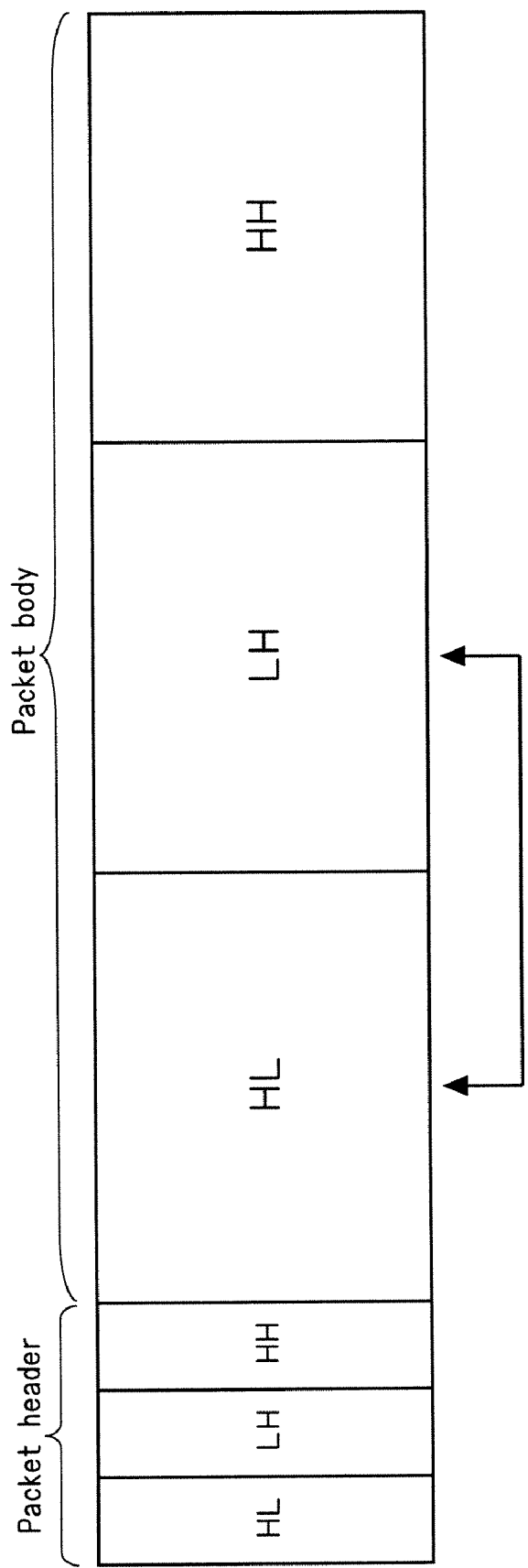
FIG. 19 is a diagram showing an example of the structure of a packet.
Figure 20:
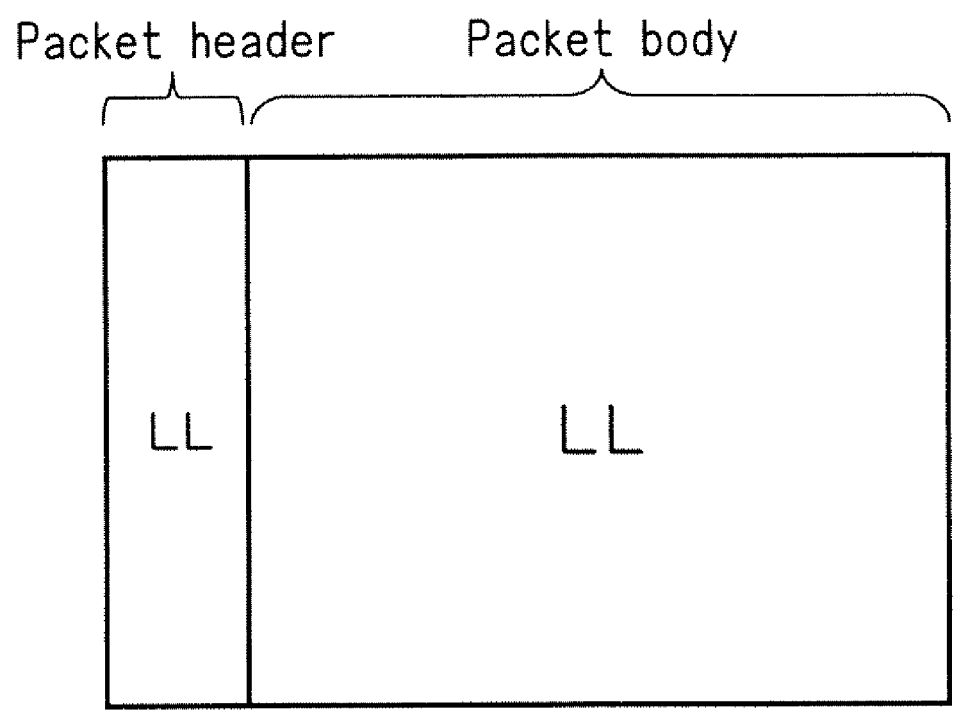
FIG. 20 is a diagram showing an example of the structure of a packet.

The bit stream generating unit 23 generates a packetized bit stream. FIGS. 19 and 20 are schematic diagrams each showing an example of the configuration of a packet. A packet is constructed by a packet body and a packet header added at the head of the packet. The packet header includes various information necessary for decoding packet data. In the packet body of the packet shown in FIG. 19, coded data CD of a part corresponding to the code block of the component HL, coded data CD of a part corresponding to the code block of the component LH, and coded data CD of a part corresponding to the code block of the component HH is disposed in this order. In the packet body of the packet shown in FIG. 20, the coded data CD of the part corresponding to the code block of the component LL is disposed.

As shown in FIG. 1, the control information ED from the direction converting unit 24 is input to the bit stream generating unit 23. The control information ED includes information of the rotation angle and the inverting direction.

On the basis of the control information ED, in the case where the rotation angle is 90° or 270° in the right direction, the bit stream generating unit 23 generates packet data by interchanging the coded data CD of the part corresponding to the code block of the component LH and the coded data CD of the part corresponding to the code block of the component HL with each other in the packet body of the packet shown in FIG. 19. On the other hand, when the rotation angle is 0° or 180° in the right direction, without performing the process of interchanging the coded data CD, the bit stream generating unit 23 generates packet data.

Effect of Image Encoding Apparatus 1

In the image encoding apparatus 1 according to the first embodiment, the direction converting unit 24 as a rotating unit performs a process of rotating an image on a code block unit basis. Therefore, without using a memory having a large storage capacity and without causing tile distortion, the image rotating process can be executed efficiently.

By a relatively simple process of generating one of the write address CTW and the read address CTR on the basis of rotation control information (rotation/inversion control information SS) in the address generating unit 242, the image rotating process can be executed.

In the case where the rotation angle is 90° or 270° in the right direction, the bit stream generating unit 23 interchanges between image data of the part corresponding to the code block of the component LH and the image data of the part corresponding to the code block of the component HL. Consequently, a situation that mismatch occurs in image data due to the rotating process can be avoided.

The DWT unit 13 changes the order of execution on outputs of the vertical and horizontal filters in accordance with the rotation angle. Consequently, the positional relations of the components (LL, HL, LH, and HH) of the filter factor of each of pixels in the code block before the rotating process can be varied according to the rotation angle. Therefore, the code block before the rotating process can be properly generated at each rotation angle so that the positional relations of the components (LL), (HL), (LH), and (HH) in the code block DD after the rotating process become standard positional relations (the right part of FIG. 12) in the JPEG 2000 compression.

In the image encoding apparatus 1 of the first embodiment, the direction converting unit 24 as an inverting unit performs a process of inverting an image on a code block unit basis. Therefore, without using a memory having a large storage capacity and without causing tile distortion, the image inverting process can be executed efficiently.

By a relatively simple process of generating one of the write address CTW and the read address CTR on the basis of inversion control information (rotation/inversion control information SS) in the address generating unit 24, the image inverting process can be executed.

The DWT unit 13 changes the order of execution on outputs of the low-pass and high-pass filters according to whether the number of data pieces to be inverted is an even number or odd number. Consequently, the positional relations of the components (LL, HL, LH, and HH) of the filter factor of each of pixels in the code block before the inverting process can be varied according to the inverting direction. Therefore, the code block before the inverting process can be properly generated in each of inverting directions so that the positional relations of the components (LL), (HL), (LH), and (HH) in the code block DD after the inverting process become standard positional relations (the right part of FIG. 12) in the JPEG 2000 compression.

Second Embodiment

Although the image encoding apparatus for coding an input image signal and outputting a compressed image has been described in the foregoing first embodiment, in a second embodiment, an image decoding apparatus for decoding an input compressed image and outputting an image signal will be described. The points different from the first embodiment will be mainly described below.

Outline of Apparatus

Figure 21:
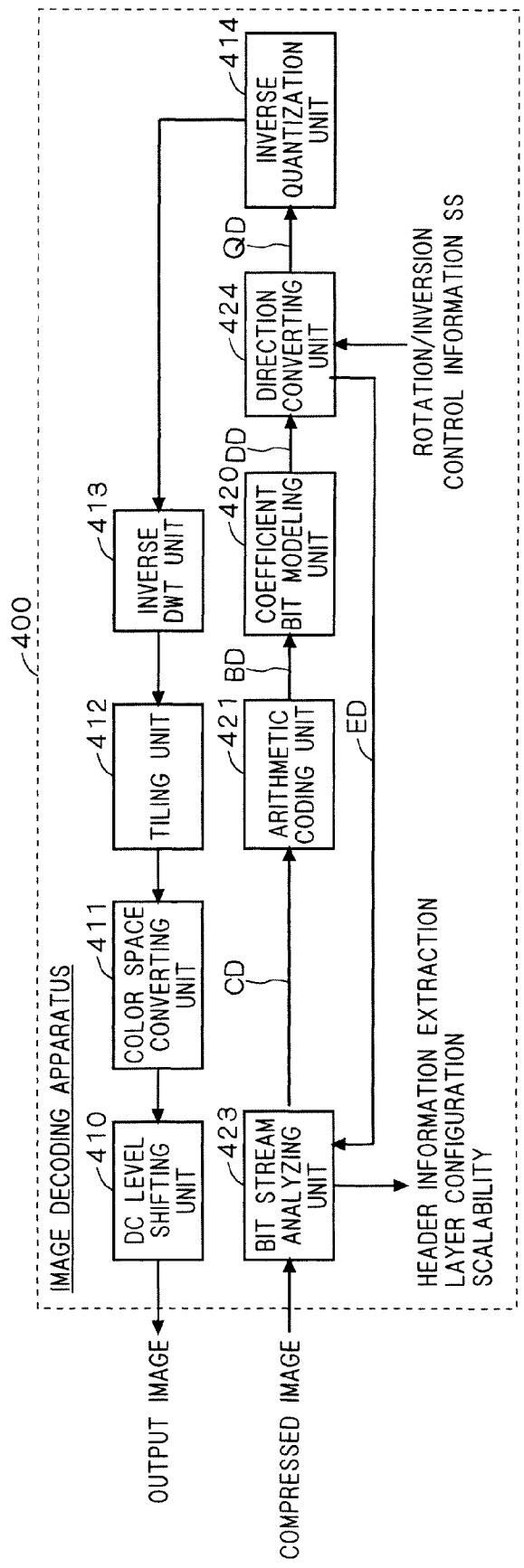
FIG. 21 is a functional block diagram showing the configuration of an image decoding apparatus of a second embodiment of the present invention.

FIG. 21 is a functional block diagram showing the configuration of an image decoding apparatus 400 on the basis of JPEG 2000 compression, according to a second embodiment of the present invention. As shown in FIG. 21, the image decoding apparatus 400 has a DC level shifting unit 410, a color space converting unit 411, a tiling unit 412, an inverse DWT unit 413, an inverse quantization unit 414, a direction converting unit 424, a coefficient bit modeling unit 420, an arithmetic decoding unit 421, and a bit stream analyzing unit 423.

All or part of the processing units 410 to 414, 420, 421, 423, and 424 constructing the image decoding apparatus 400 may be constructed by hardware or a program for making a microprocessor function.

The bit stream analyzing unit 423 analyzes a bit stream of a compressed image supplied from the outside and separates the coded data CD and additional information (header information, layer configuration, scalability, a quantization table, and the like) from each other.

The arithmetic decoding unit 421 performs arithmetic decoding on the coded data CD supplied from the bit stream analyzing unit 423 and outputs decoded data BD. Although the arithmetic decoding is employed in the second embodiment, the invention is not limited to the arithmetic decoding and entropy decoding of another method may be employed.

The coefficient bit modeling unit 420 generates the code block DD on the basis of the decoded data BD supplied from the arithmetic decoding unit 421.

The direction converting unit 424 generates a transform coefficient QD on the basis of the code block DD supplied from the coefficient bit modeling unit 420. The rotation/inversion control information SS is also input from the outside to the direction converting unit 424. On the basis of the rotation/inversion control information SS, the direction converting unit 424 performs the image rotating process and the image inverting process on the code block unit basis. That is, the direction converting unit 424 functions as a rotating unit for performing the image rotating process on the code block unit basis and also functions as an inverting unit for performing the image inverting process on the code block unit basis. The direction converting unit 424 does not always have to have both of the functions of the rotating process and the inverting process but may have only one of the functions. Further, the direction converting unit 424 outputs the control information ED including the information of the rotation angle and the inverting direction.

The inverse quantization unit 414 performs scalar inverse-quantization on the transform coefficient QD supplied from the direction converting unit 424 and outputs, as a result of the scalar inverse-quantization, the transform coefficient. The inverse quantization unit 414 also has the function of performing a predetermined bit shifting process.

The inverse DWT unit 413 performs integer-type or real-type inverse DWT on the tile unit basis on the transform coefficient supplied from the inverse quantization unit 414 and recursively combines high-pass and low-pass components of the transform coefficient, thereby generating the image signal divided into a plurality of tiles.

The tiling unit 412 generates an image signal by performing a process of combining a plurality of tiles on the image signal supplied from the inverse DWT unit 413. In the present invention, a case of processing image signals of one frame as one tile and a case where image signals are divided into a small number of tiles each having a relatively large size to avoid or suppress occurrence of tile distortion are assumed. In the case where image signals of one frame are processed as one tile, it is sufficient to output the image signal supplied from the inverse DWT unit 413 as it is to a function block at the next stage. The present invention can be also applied to an apparatus in which a normal tiling process is performed.

The color space converting unit 411 performs a predetermined color space converting process on the image signal input from the tiling unit 412. For example, the color space converting unit 411 converts a YCbCr signal or YUV signal to an RGB signal and outputs the RGB signal.

The DC level shifting unit 410 performs a DC level shifting process as necessary on the image signal supplied from the color space converting unit 411 and outputs an image signal (the output image in FIG. 21) to the outside.

Process of Direction Converting Unit 424

The image rotating/inverting process on the code block unit basis executed by the direction converting unit 424 shown in FIG. 21 will be described in detail hereinbelow.

Figure 22:
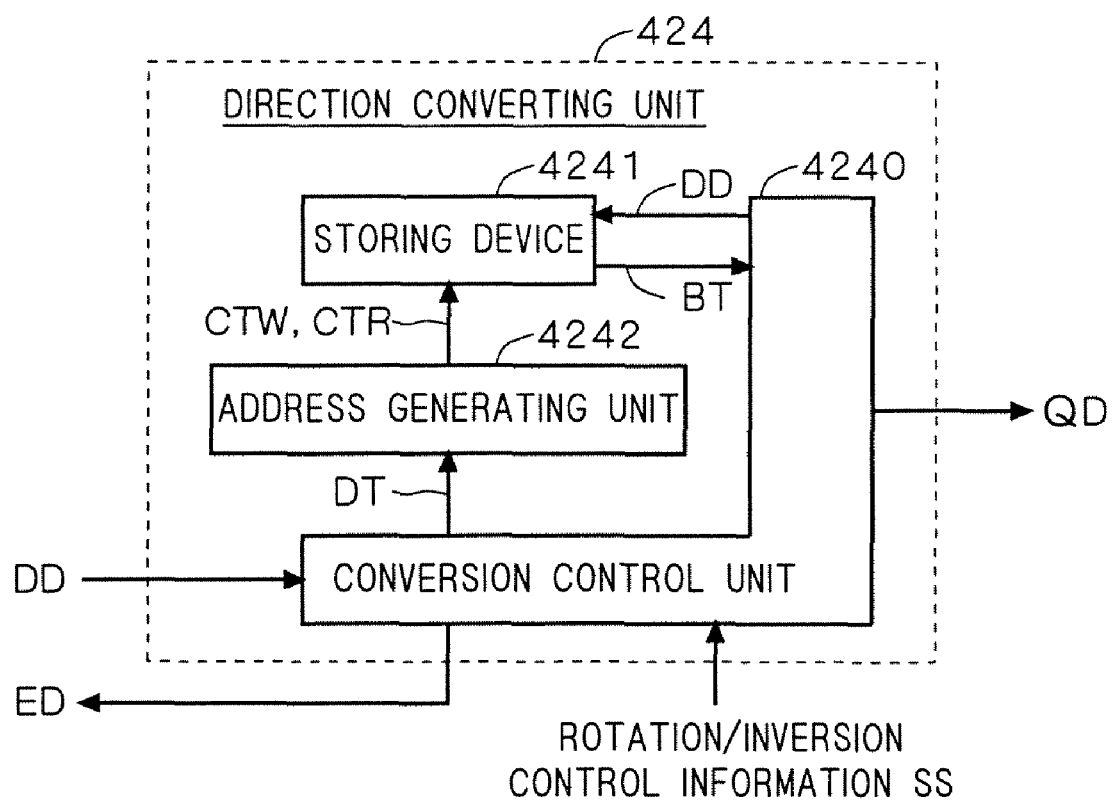
FIG. 22 is a functional block diagram showing the configuration of a direction converting unit.

FIG. 22 is a functional block diagram showing the configuration of the direction converting unit 424. As shown in FIG. 22, the direction converting unit 424 has a conversion control unit 4240, an address generating unit 4242, and a storing device 4241.

The storing device 4241 is a semiconductor memory such as DRAM and has a storage capacity corresponding to the data size of the code block DD. The conversion control unit 4240 writes the code block DD supplied from the coefficient bit modeling unit 420 shown in FIG. 21 to the storing device 4241 on the basis of the write address CTW generated by the address generating unit 4242.

To the conversion control unit 4240, the rotation/inversion control information SS including the information of the rotation angle and the inversion direction is input from the outside. In the case of writing the code block DD to the storing device 4241, the conversion control unit 4240 generates a control signal DT on the basis of the rotation/inversion control information SS and sub-band information of the code block DD. The control signal DT is input to the address generating unit 4242, and the address generating unit 4242 generates the write address CTW on the basis of the control signal DT.

The image rotating/inverting process is realized by the write address CTW generated by the address generating unit 4242. Specifically, at the time of writing the code block DD to the storing device 4241, by accessing the storing device 4241 in predetermined order on the basis of the write address CTW, the code block BT subjected to the rotating/inverting process is written in the storing device 4241. A method of generating the write address CTW is similar to that in the first embodiment.

After that, by accessing the storing device 4241 in the raster scan order on the basis of the read address CTR generated by the address generating unit 4242, the code block BT subjected to the rotating/inverting process is read from the storing device 4241. The conversion control unit 4240 generates the transform coefficient QD on the basis of the code block BT. The conversion control unit 4240 generates and outputs the control information ED including the information of the rotation angle and the inverting direction. The control information ED is input to the bit stream analyzing unit 423 shown in FIG. 21.

In the above description, at the time of writing the code block DD to the storing device 4241, the rotating/inverting process is performed on the basis of the write address CTW. At the time of reading the code block BT from the storing device 4241, an access is performed in the raster scan order. On the contrary, at the time of writing the code block DD to the storing device 4241, the storing device 4241 may be accessed in the raster scan order. At the time of reading the code block BT from the storing device 4241, by accessing the storing device 4241 in predetermined order on the basis of the read address CTR, the rotating/inverting process may be performed. In this case, the conversion control unit 4240 generates the control signal DT on the basis of the rotation/inversion control information SS and the sub-band information of the code block DD, and the address generating unit 4242 generates the read address CTR on the basis of the control signal DT.

In a manner similar to the first embodiment, in the case where the rotation angle is 90° or 270° in the right direction, a process of interchanging between the component HL and the component LH has to be performed on the code block DD input to the direction converting unit 424. The interchanging process is executed by the bit stream analyzing unit 423 on the basis of the control information ED. In the case of the 0° or 180° rotation in the right direction, such an interchanging process is unnecessary.

Process of Inverse DWT Unit 413

The process of the inverse DWT executed by the inverse DWT unit 413 shown in FIG. 22 will be described in detail hereinbelow.

The inverse DWT (composition side) used in JPEG 2000, Part 1, has the following rules.

In the 9×7 tap filter, an even-numbered input is made of 7 pixels, and an odd-numbered input is made of 9 pixels.

In Part 1 Profile 0, the upper left corner of each sub-band is used as the origin, so that the first input is always a low-pass output.

Next, the number of pieces of data to be excessively read to the inverse DWT unit 413 in order to execute inverse DWT will be considered. FIGS. 23A to 23D are diagrams showing positional relations of input/output data in the case of executing the inverse DWT by using a filter of 9×7 taps. FIG. 23A shows a case where a target data sequence starts from even-numbered data (low-pass data L) and the number of data pieces is an even number. FIG. 23B shows a case where a target data sequence starts from even-numbered data (low-pass data L) and the number of data pieces is an odd number. FIG. 23C shows a case where a target data sequence starts from odd-numbered data (high-pass data H) and the number of data pieces is an even number. FIG. 23D shows a case where a target data sequence starts from odd-numbered data (high-pass data H) and the number of data pieces is an odd number. In the case of using a filter of 9×7 taps, four patterns shown in FIGS. 23A to 23D are considered by combinations of odd-number and even-number of start data and odd-number and even-number as the number of data pieces. In Part 1, Profile 0, even-numbered data is always start data. Consequently, only the cases of FIGS. 23A and 23B are possible.

In the case of combining even-numbered pixels, a 7-tap filter is used. In the case of combining odd-numbered pixels, a 9-tap filter is used.

According to the JPEG 2000 compression, in the inverse DWT, the order of processes is determined in such a manner that, first, a combining horizontal filter is applied and then a combining vertical filter is applied. In the case of performing decoding in the JPEG 2000 compression, to perfectly regain data by a combining filter, the execution order of the vertical and horizontal filters and the sequence of the high-pass data H and the low-pass data L are important.

Figure 24:
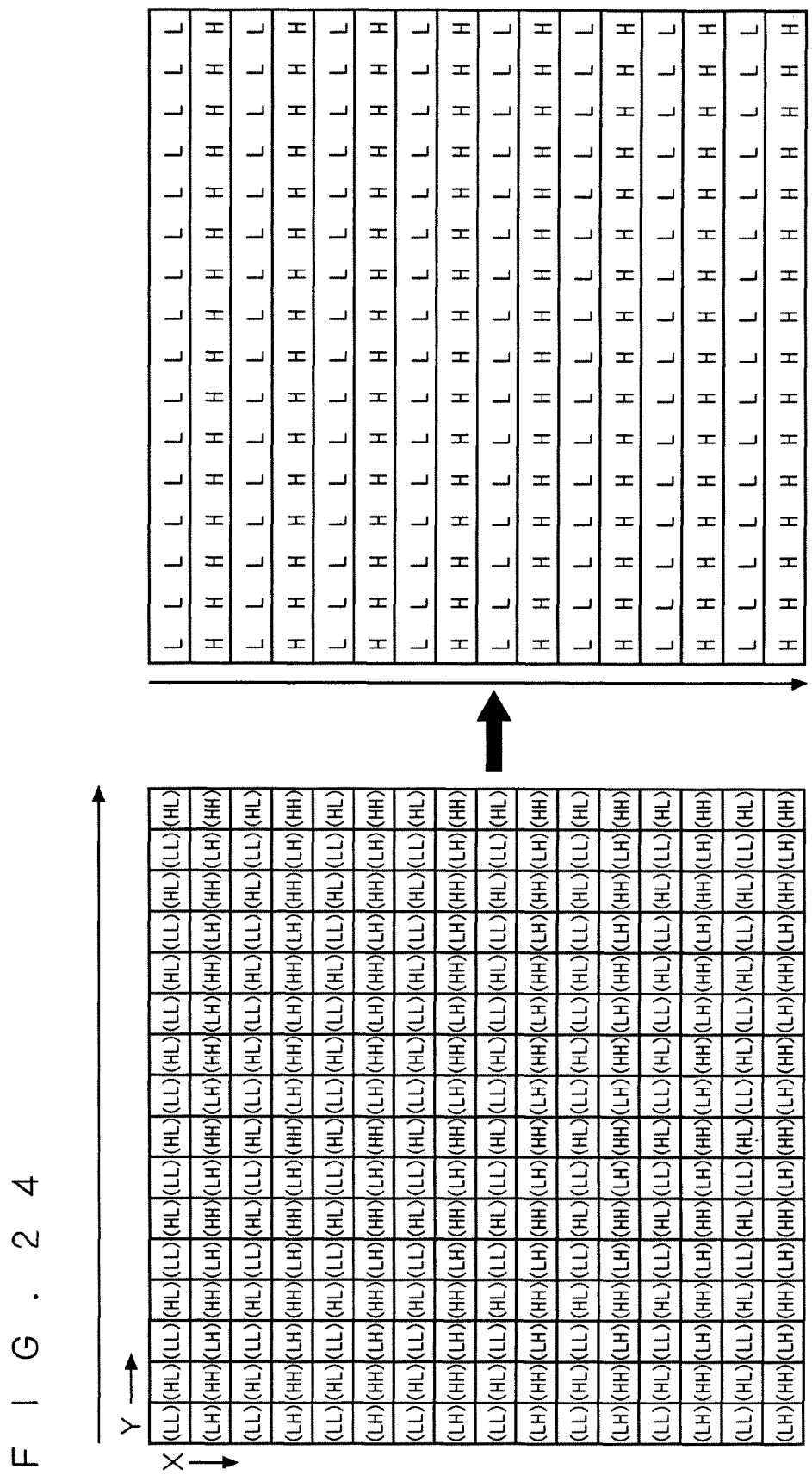
FIG. 24 is a diagram showing a state where image signals of 16 rows by 16 columns are subjected to a two-dimensional filter in accordance with the order of a combining horizontal filter and a combining vertical filter.

FIG. 24 is a diagram showing a state where a two-dimensional filter is applied on image signals of 16 rows (from the $0^{th}$ row to the $15^{th}$ row) by 16 columns (from the $0^{th}$ column to the $15^{th}$ column) in order of a combining horizontal filter and a combining vertical filter. The left part of FIG. 24 shows a state before the combining horizontal filter is applied. The right part shows a state after the combining horizontal filter is applied.

In the left part of FIG. 24, (LL) denotes that both of the horizontal and vertical components are L, (HL) denotes that the horizontal component is H and the vertical component is L, (LH) denotes that the horizontal component is L and the vertical component is H, and (HH) indicates that both of the horizontal and vertical components are H. The arrow X indicates the vertical direction, and the arrow Y expresses the horizontal direction.

As shown in the right part of FIG. 24, by applying the combining horizontal filter, even-numbered rows become low-pass data L, and odd-numbered rows become high-pass data H.

First, the inverting process will be examined. In the case where the number of data pieces is an even number as shown in FIGS. 23A and 23C, by performing the inverting process, the positions of the input data H and L are interchanged. On the other hand, in the case where the number of data pieces is an odd number as shown in FIGS. 23B and 23D, even when the inverting process is performed, the positions of the input data H and L are not interchanged. Therefore, in the case of performing the inverting process, the execution order on the inputs of the low-pass filter and the high-pass filter has to be changed in accordance with the number of data pieces (the odd number or even number).

Concretely, the inverse DWT unit 413 has a combining horizontal filter made of a low-pass filter and a high-pass filter and a combining vertical filter similarly made of a low-pass filter and a high-pass filter. Although not shown in FIG. 21, the rotation/inversion control information SS is also input to the inverse DWT unit 413. In the case where the inverse DWT unit 413 performs the lateral inversion process on the basis of the rotation/inversion control information SS, the execution order on inputs of the low-pass filter and the high-pass filter in the combining horizontal filter is not changed when the number of pieces of data in a data sequence inverted is odd number, but is changed when the number of pieces of data is even number. Similarly, in the case where the inverse DWT unit 413 performs the vertical inversion process on the basis of the rotation/inversion control information SS, the execution order on inputs of the low-pass filter and the high-pass filter in the vertical filter is not changed when the number of pieces of a data sequence inverted is odd number, but is changed when the number of pieces of data is even number.

Next, the rotating process will be examined. In the case of performing the rotating process in the image decoding apparatus 400, before the rotating process is performed by the direction converting unit 424, the positional relations of the components (LL), (HL), (LH), and (HH) are as shown in the right part of FIG. 12. The positional relations in the inverting process are similar to the above.

When the lateral inversion process is performed on the image signals in the right part of FIG. 12, the left part of FIG. 13 is resulted. When the 270° right rotation process is performed on the image signals in the left part of FIG. 13, the right part of FIG. 13 is resulted.

To obtain the image signals in the right part of FIG. 13, it is sufficient to change the execution order of the combining horizontal filter and the combining vertical filter in the inverse DWT unit 413. That is, the combining vertical filter is applied first and the combining horizontal filter is applied next. In the right part of FIG. 13, (LL) denotes that both of the vertical and horizontal components are L, (HL) denotes that the vertical component is H and the horizontal component is L, (LH) denotes that the vertical component is L and the horizontal component is H, and (HH) indicates that both of the horizontal and vertical components are H.

Although the case of performing the 90° right rotation process has been described above, also in the case of performing the 270° right rotation process, the execution order of the combining horizontal filter and the combining vertical filter has to be similarly changed. On the other hand, in the case of performing the 0° right rotation or 180° right rotation, it is unnecessary to change the execution order of the combining horizontal filter and the combining vertical filter. It is sufficient to apply the combining horizontal filter first and then the combining vertical filter like the normal case.

Concretely, the inverse DWT unit 413 has a combining horizontal filter made of a low-pass filter and a high-pass filter and a combining vertical filter similarly made of a low-pass filter and a high-pass filter. Although not shown in FIG. 21, the rotation/inversion control information SS is also input to the inverse DWT unit 413. In the case where the inverse DWT unit 413 performs the 90° right rotation or 270° right rotation on the basis of the rotation/inversion control information SS, the filtering process is executed in order of the combining vertical filter and then the combining horizontal filter. On the other hand, in the case of performing the 0° right rotation or 180° right rotation, the filtering process is executed in order of the combining horizontal filter and the combining vertical filter.

The configuration and operation of the inverse DWT unit 413 will be more specifically described below. The processes of line-based inverse wavelet transform as one of two-dimensional inverse wavelet transforms will be described.

Figure 25:
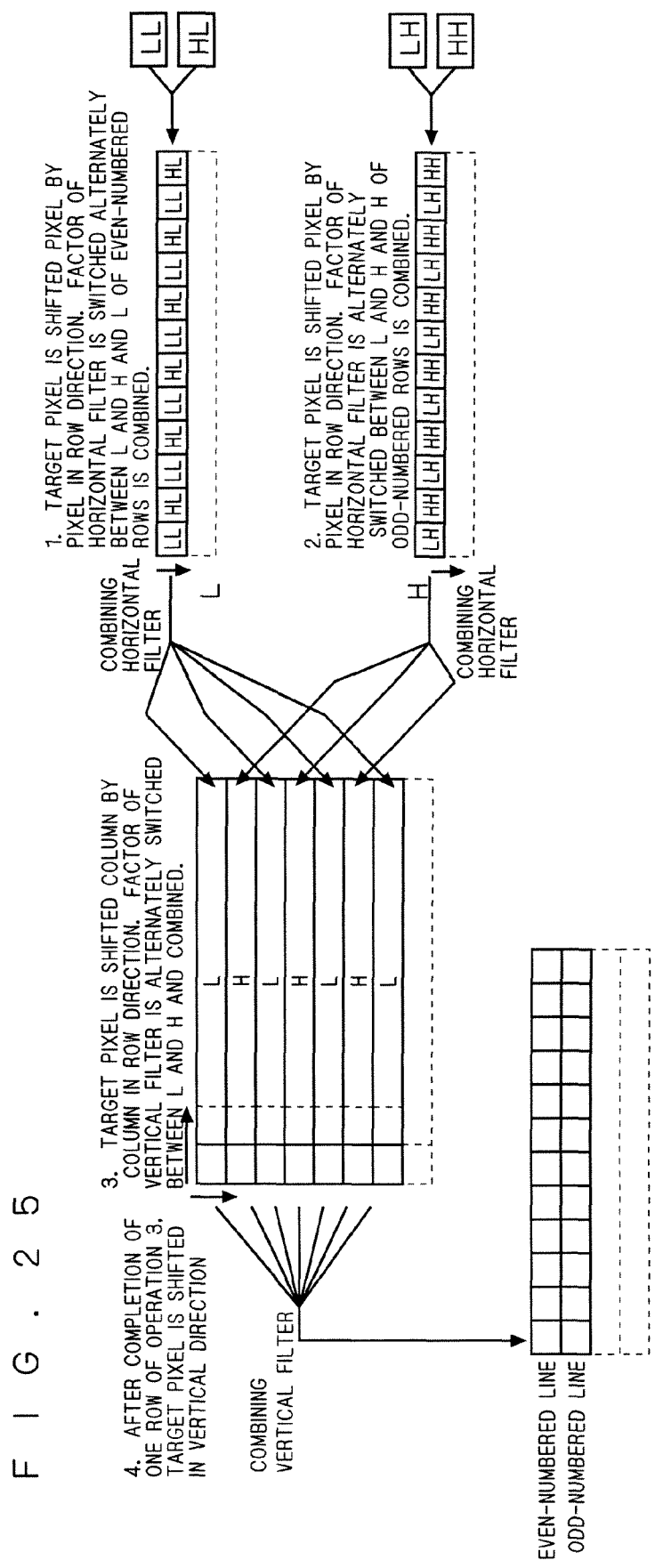
FIG. 25 is a diagram showing a first configuration of a reverse DWT unit realizing line-based inverse wavelet transform.

FIG. 25 is a diagram showing a first configuration of the inverse DWT unit 413 realizing the line-based inverse wavelet transform. In the configuration, one combining vertical filter is disposed after two combining horizontal filters. In the case of performing the 0° right rotation or 180° right rotation, the filter having this configuration is used.

With reference to FIG. 25, first, the filtering process with a combining horizontal filter for even-numbered lines and a combining horizontal filter for odd-numbered lines is performed. A target pixel is shifted one by one in the row direction. The factor of the combining horizontal filter is alternately switched between L and H on the pixel unit basis. After processes of one row are finished, the target pixel is shifted by one in the vertical direction, and similar process is repeated. When outputs from the combining horizontal filter become equal to the amount of a row in the combining vertical filter, the filtering process with the combining vertical filter is performed. The target column is shifted one by one in the row direction and, after completion of the process on one row, the target column is shifted by one in the vertical direction. The factor of the combining vertical filter is L or H in the same row, and L and H are alternately switched row by row.

Figure 26:
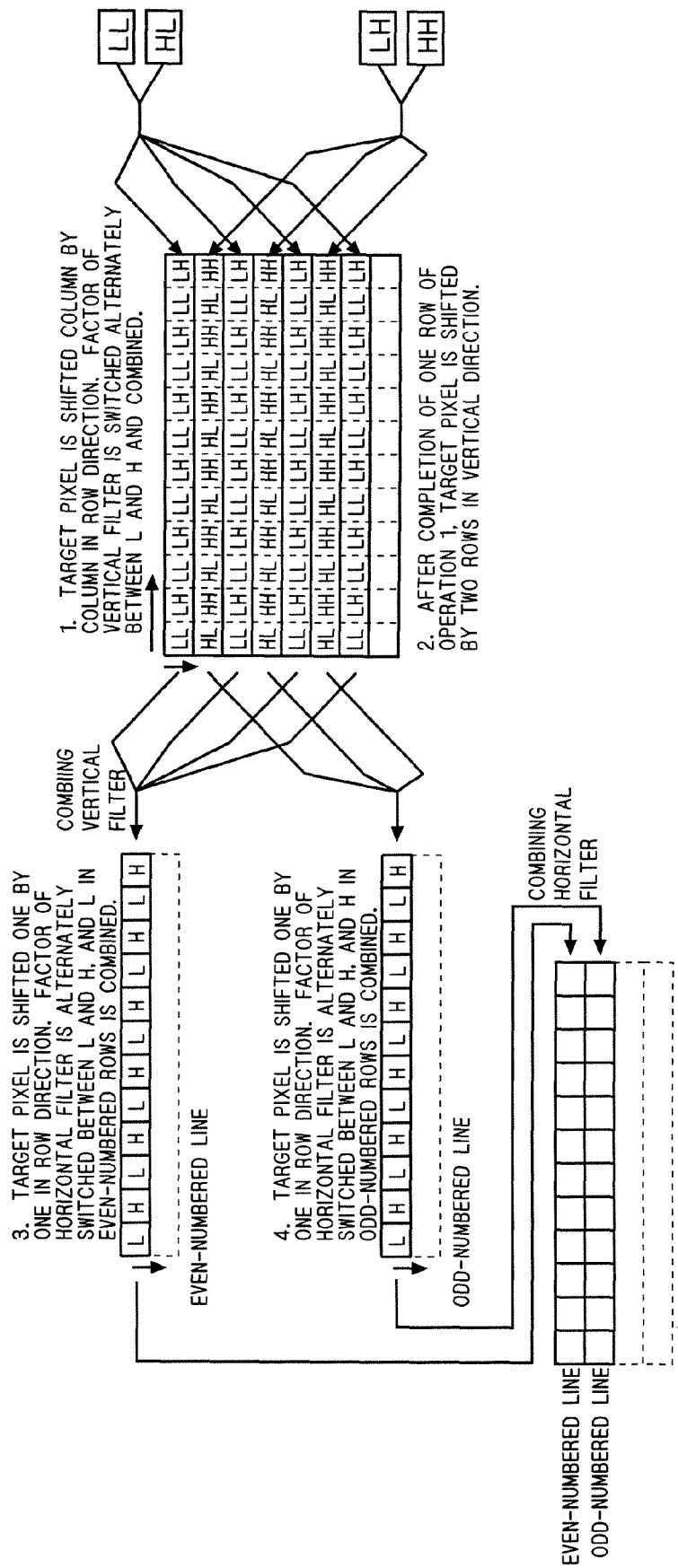
FIG. 26 is a diagram showing a second configuration of the reverse DWT unit realizing the line-based inverse wavelet transform.

FIG. 26 is a diagram showing a second configuration of the inverse DWT unit 413 realizing the line-based inverse wavelet transform. In the configuration, two combining horizontal filters are disposed after one combining vertical filter. In the case of performing the 90° right rotation or 270° right rotation, the filter having this configuration is used.

With reference to FIG. 26, first, the filtering process with the combining vertical filter is performed. A target column is shifted one by one in the row direction. After processes of one row are finished, the target pixel is shifted by one in the vertical direction. The factor of the combining vertical filter is L or H in the same row, and L and H are alternately switched row by row. Next, the filtering process with the combining horizontal filter for even-numbered lines and the combining horizontal filter for odd-numbered lines is performed. A target pixel is shifted one by one in the row direction. The factor of the combining horizontal filter is alternately switched between L and H on the pixel unit basis.

The filter configuration of FIG. 25 and that of FIG. 26 may not be different from each other. It is also possible to employ the configuration of FIG. 25 also in the case of performing the 90° right rotation or 270° right rotation by properly setting the factors of the combining vertical filter and the combining horizontal filter.

Process of Bit Stream Analyzing Unit 423

The process of the bit stream analyzing unit 423 shown in FIG. 21 will be described below.

To the bit stream analyzing unit 423, a packetized bit stream is input from the outside. As shown in FIG. 19, a packet is constructed by a packet body and a packet header. In the packet body, coded data CD of a part corresponding to the code block of the component HL, coded data CD of a part corresponding to the code block of the component LH, and coded data CD of a part corresponding to the code block of the component HH is disposed in this order.

As shown in FIG. 21, the control information ED from the direction converting unit 424 is input to the bit stream analyzing unit 423. The control information ED includes information of the rotation angle and the inverting direction.

On the basis of the control information ED, in the case where the rotation angle is 90° or 270° in the right direction, the bit stream analyzing unit 423 generates coded data CD shown in FIG. 21 by interchanging the image data of the part corresponding to the code block of the component LH and the image data of the part corresponding to the code block of the component HL with each other in the packet body of the packet shown in FIG. 19. On the other hand, when the rotation angle is 0° or 180° in the right direction, without performing the process of interchanging the image data, the bit stream analyzing unit 423 generates the coded data CD shown in FIG. 21.

Effect of Image Decoding Apparatus 400

In the image decoding apparatus 400 according to the second embodiment, the direction converting unit 424 as the rotating unit performs the image rotating process on the code block unit basis. Therefore, without using a memory of large memory capacity and without causing tile distortion, the image rotating process can be efficiently executed.

By a relatively simple process of generating one of the write address CTW and the read address CTR on the basis of rotation control information (rotation/inversion control information SS) in the address generating unit 4242, the image rotating process can be executed.

In the case where the rotation angle is 90° or 270° in the right direction, the bit stream analyzing unit 423 interchanges between image data of the part corresponding to the code block of the component LH and the image data of the part corresponding to the code block of the component HL. Consequently, a situation that mismatch occurs in the coded data CD due to the rotating process can be avoided.

The inverse DWT unit 413 changes the execution order of the combining vertical and horizontal filters in accordance with the rotation angle. Consequently, the transform coefficient QD obtained from the code block BT after the rotating process can be properly combined according to the rotation angle.

In the image decoding apparatus 400 of the second embodiment, the direction converting unit 424 as an inverting unit performs a process of inverting an image on a code block unit basis. Therefore, without using a memory having a large storage capacity and without causing tile distortion, the image inverting process can be executed efficiently.

By a relatively simple process of generating one of the write address CTW and the read address CTR on the basis of inversion control information (rotation/inversion control information SS) in the address generating unit 24, the image inverting process can be executed.

The inverse DWT unit 413 changes the order of execution on inputs of the low-pass and high-pass filters according to whether the number of data pieces inverted is an even number or odd number. Consequently, the transform coefficient QD obtained from the code block BT after the inverting process can be properly combined according to the inverting direction.

While the invention has been shown and described in detail, the foregoing description is in all aspects illustrative and not restrictive. It is therefore understood that numerous modifications and variations can be devised without departing from the scope of the invention.

What is claimed is:

1. An image encoding apparatus having a processor, the apparatus comprising:
a wavelet transforming unit configured to generate transform coefficients of a plurality of band components by recursively splitting image signals to a high-pass component and a low-pass component by wavelet transformation;
a quantizing unit configured to quantize said transform coefficients;
a rotating unit configured to divide, using the processor, said quantized transform coefficients on a code block unit basis and, on the basis of rotation control information including rotation angle input from outside, and configured to perform, using the processor, an image rotating process on said code block unit basis, the rotating unit including an address generating unit configured to generate, on the basis of said rotation control information, at least one of a write address used at a time of writing said code block to a memory and a read address used at a time of reading said code block from said memory; and
a coding unit configured to perform entropy coding on said code block.

2. The image encoding apparatus according to claim 1, wherein
said memory has a storage capacity corresponding to data size of said code block and writing/reading said code block, and said address generating unit generates the at least one of said write address and said read address on the basis of said rotation control information, thereby reading said code block subjected to said rotating process from said memory.

3. The image encoding apparatus according to claim 1, further comprising a bit stream generating unit configured to generate a bit stream of coded image data,
wherein when said rotation angle is a predetermined angle, said bit stream generating unit generates said bit stream by interchanging said image data of a part corresponding to a code block of a horizontal low-pass and vertical high-pass component and said image data of a part corresponding to the code block of the horizontal high-pass and vertical low-pass component with each other.

4. The image encoding apparatus according to claim 1, wherein said wavelet transforming unit includes a vertical filter and a horizontal filter and changes an execution order of said vertical filter and said horizontal filter in accordance with said rotation angle.

5. An image decoding apparatus having a processor, the apparatus comprising:
a decoding unit configured to generate a code block by performing entropy decoding on a code block unit basis on coded data of an image;
a rotating unit configured to generate, using the processor, a transform coefficient by performing an image rotating process on said code block unit basis, based on rotation control information including rotation angle input from outside, the rotating unit including an address generating unit configured to generate, on the basis of said rotation control information, at least one of a write address used at a time of writing said code block to a memory and a read address used at a time of reading said code block from said memory;
an inverse-quantizing unit configured to perform inverse quantization on said transform coefficient; and
an inverse wavelet transforming unit configured to generate an image signal by recursively combining a high-pass component and a low-pass component of said inverse-quantized wavelet transformation by inverse wavelet transform.

6. The image decoding apparatus according to claim 5, wherein
said memory has a storage capacity corresponding to data size of said code block and writing/reading said code block, and
said address generating unit generates the at least one of said write address and said read address on the basis of said rotation control information, thereby reading said code block subjected to said rotating process from said memory.

7. The image decoding apparatus according to claim 5, further comprising a bit stream analyzing unit configured to generate said coded data by analyzing a bit stream of coded image data,
wherein when said rotation angle is a predetermined angle, said bit stream analyzing unit generates said coded data by interchanging said image data of a part corresponding to a code block of a horizontal low-pass and vertical high-pass component and said image data of a part corresponding to the code block of the horizontal high-pass and vertical low-pass component with each other.

8. The image decoding apparatus according to claim 5, wherein said wavelet transforming unit includes a vertical filter and a horizontal filter and changes an execution order of said vertical filter and said horizontal filter in accordance with said rotation angle.

9. An image encoding apparatus having a processor, the apparatus comprising:
a wavelet transforming unit configured to generate transform coefficients of a plurality of band components by recursively splitting image signals to a high-pass component and a low-pass component by wavelet transformation;
a quantizing unit configured to quantize said transform coefficients;
a rotating unit configured to divide, using the processor, said quantized transform coefficients on a code block unit basis and, on the basis of rotation control information including rotation angle input from outside, and configured to perform, using the processor, an image rotating process on said code block unit basis;
a coding unit configured to perform entropy coding on said code block; and
a bit stream generating unit configured to generate a bit stream of coded image data,
wherein when said rotation angle is a predetermined angle, said bit stream generating unit generates said bit stream by interchanging said image data of a part corresponding to a code block of a horizontal low-pass and vertical high-pass component and said image data of a part corresponding to the code block of the horizontal high-pass and vertical low-pass component with each other.

10. The image encoding apparatus according to claim 9, wherein said wavelet transforming unit includes a vertical filter and a horizontal filter and changes an execution order of said vertical filter and said horizontal filter in accordance with said rotation angle.

11. An image decoding apparatus having a processor, the apparatus comprising:
a decoding unit configured to generate a code block by performing entropy decoding on a code block unit basis on coded data of an image;
a rotating unit configured to generate, using the processor, a transform coefficient by performing an image rotating process on said code block unit basis, based on rotation control information including rotation angle input from outside;
an inverse-quantizing unit configured to perform inverse quantization on said transform coefficient;
an inverse wavelet transforming unit configured to generate an image signal by recursively combining a high-pass component and a low-pass component of said inverse-quantized wavelet transformation by inverse wavelet transform; and
a bit stream analyzing unit configured to generate said coded data by analyzing a bit stream of coded image data,
wherein when said rotation angle is a predetermined angle, said bit stream analyzing unit generates said coded data by interchanging said image data of a part corresponding to a code block of a horizontal low-pass and vertical high-pass component and said image data of a part corresponding to the code block of the horizontal high-pass and vertical low-pass component with each other.

12. The image decoding apparatus according to claim 11, wherein said wavelet transforming unit includes a vertical filter and a horizontal filter and changes an execution order of said vertical filter and said horizontal filter in accordance with said rotation angle.

* * * * *